United States Patent
Khan et al.

(10) Patent No.: US 10,599,361 B2
(45) Date of Patent: Mar. 24, 2020

(54) SYSTEM AND METHOD FOR BACKUP TOPOLOGY MAP

(71) Applicant: EMC IP Holding Company LLC, Hopkinton, MA (US)

(72) Inventors: Asif Khan, Bangalore (IN); Shelesh Chopra, Bangalore (IN); Matthew Dickey Buchman, Seattle, WA (US); Bharat Bhushan, Bangalore (IN); Krishnendu Bagchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 44 days.

(21) Appl. No.: 16/022,604

(22) Filed: Jun. 28, 2018

(65) Prior Publication Data
US 2020/0004424 A1    Jan. 2, 2020

(51) Int. Cl.
| | | |
|---|---|---|
| G06F 12/00 | (2006.01) | |
| G06F 3/06 | (2006.01) | |
| G06F 13/00 | (2006.01) | |
| G06F 13/28 | (2006.01) | |
| G06F 3/0481 | (2013.01) | |

(52) U.S. Cl.
CPC ............ G06F 3/065 (2013.01); G06F 3/067 (2013.01); G06F 3/0619 (2013.01); G06F 3/0664 (2013.01); *G06F 3/0481* (2013.01)

(58) Field of Classification Search
CPC ...... G06F 3/065; G06F 3/0619; G06F 3/0664; G06F 3/0481
See application file for complete search history.

(56) References Cited

U.S. PATENT DOCUMENTS

| | | | | |
|---|---|---|---|---|
| 7,266,781 B1* | 9/2007 | Burlowski | .......... | G06F 11/1448 704/204 |
| 7,418,619 B1* | 8/2008 | Uhlmann | ............ | G06F 11/1451 714/2 |
| 8,600,947 B1* | 12/2013 | Freiheit | ............... | G06F 11/1458 707/654 |

(Continued)

OTHER PUBLICATIONS

Extended European Search Report issued in corresponding European Application No. 19182219.6, dated Dec. 2, 2019.

*Primary Examiner* — Mark A Giardino, Jr.
(74) *Attorney, Agent, or Firm* — Chamberlain, Hrdlicka, White, Williams & Aughtry

(57) ABSTRACT

A backup agent for orchestrating backups of production hosts includes a persistent storage that stores backup policies and a backup manager that obtains a backup analysis request for a virtual machine hosted by the production hosts; generate a dependency graph based on: backups associated with the virtual machines, and the backup policies associated with the backups; and displays a graphical user interface, using the dependency graph, including user interactive markers based on the backups and dependency indicators interconnecting the user interactive markers. While the graphical user interface is displayed, the backup manager obtains a potential backup policy update based on a user interaction with one of the user interactive markers. After obtaining the potential backup policy update, the backup manager updates the graphical user interface to reflect the potential backup policy update. After updating the graphical user interface, the backup manager initiates generation of the backup.

20 Claims, 20 Drawing Sheets

(56) References Cited

U.S. PATENT DOCUMENTS

| | | | |
|---|---|---|---|
| 9,454,324 B1 | 9/2016 | Madhavapeddi | |
| 9,934,101 B2* | 4/2018 | Patrick | G06F 3/0484 |
| 9,977,704 B1 | 5/2018 | Chopra et al. | |
| 2005/0071390 A1* | 3/2005 | Midgley | G06F 11/1451 |
| 2008/0307345 A1* | 12/2008 | Hart | G06F 11/1448 |
| | | | 715/769 |
| 2010/0113891 A1* | 5/2010 | Barrett | A61B 5/14535 |
| | | | 600/301 |
| 2010/0306171 A1* | 12/2010 | Antos | G06F 11/1448 |
| | | | 707/638 |
| 2013/0262374 A1 | 10/2013 | Helliker et al. | |

* cited by examiner

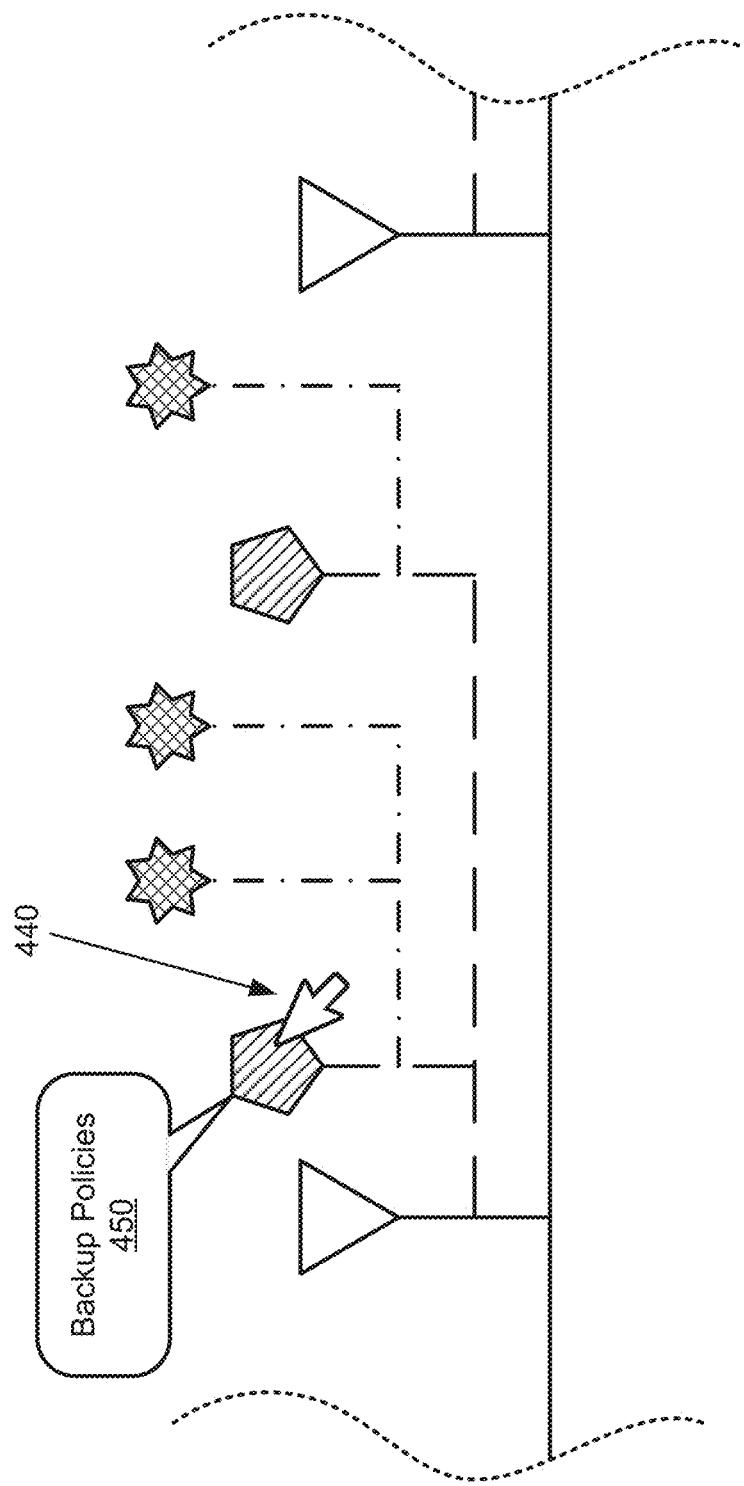

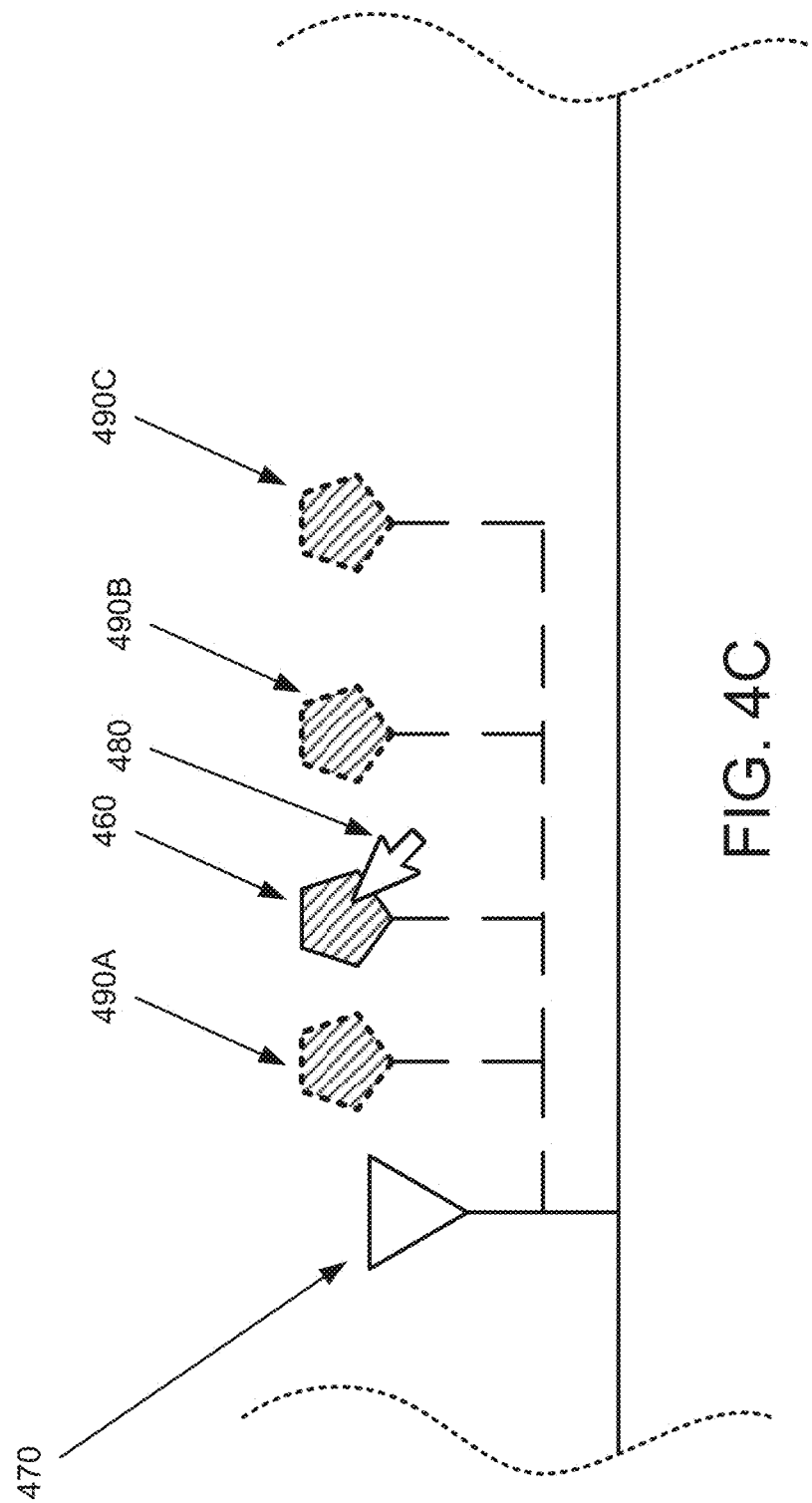

SYSTEM AND METHOD FOR BACKUP TOPOLOGY MAP

BACKGROUND

Computing devices may include any number of internal components such as processors, memory, and persistent storage. Each of the internal components of a computing device may be used to generate data. The process of generating and storing data may utilize computing resources of the computing devices such as processing and storage.

SUMMARY

In one aspect, a backup agent for orchestrating backups of production hosts in accordance with one or more embodiments of the invention includes a persistent storage and a backup manager. The persistent storage stores backup policies. The backup manager obtains a backup analysis request for a virtual machine hosted by the production hosts; generate a dependency graph based on: backups associated with the virtual machines, and the backup policies associated with the backups; and displays a graphical user interface, using the dependency graph, including user interactive markers based on the backups and dependency indicators interconnecting the user interactive markers. While the graphical user interface is displayed, the backup manager obtains a potential backup policy update based on a user interaction with one of the user interactive markers. After obtaining the potential backup policy update, the backup manager updates the graphical user interface to reflect the potential backup policy update. After updating the graphical user interface, the backup manager initiates generation of the backup of the virtual machine using an updated backup policy of the backup policies that is based on the potential backup policy update.

In one aspect, a computing device for orchestrating backups of production hosts in accordance with one or more embodiments of the invention includes a persistent storage and a backup manager. The persistent storage stores backup policies. The backup manager obtains a backup analysis request for a virtual machine hosted by the production hosts; generates a dependency graph based on backups associated with the virtual machines and the backup policies associated with the backups; transmits frames representative of a graphical user interface, using the dependency graph, including user interactive markers based on the backups and dependency indicators interconnecting the user interactive markers. After transmitting the frames, the backup manager receives a potential backup policy update based on a user interaction with one of the user interactive markers. After obtaining the potential backup policy update, the backup manager transmits frames representative of an updated graphical user interface that reflects the potential backup policy update. After updating the graphical user interface, the backup manager initiates generation of the backup of the virtual machine using an updated backup policy of the backup policies that is based on the potential backup policy update.

In one aspect, a non-transitory computer readable medium in accordance with one or more embodiments of the invention includes computer readable program code, which when executed by a computer processor enables the computer processor to perform a method for operating a backup agent for orchestrating backups of production hosts, the method including obtaining a backup analysis request for a virtual machine hosted by the production hosts; generating a dependency graph based on: backups associated with the virtual machines, and backup policies associated with the backups; displaying a graphical user interface using the dependency graph, including user interactive markers based on the backups and dependency indicators interconnecting the user interactive markers. The method further includes, while the graphical user interface is displayed, obtaining a potential backup policy update based on a user interaction with one of the user interactive markers. The method further includes, after obtaining the potential backup policy update, updating the graphical user interface to reflect the potential backup policy update. The method further includes, after updating the graphical user interface, initiating generation of the backup of the virtual machine using an updated backup policy of the backup policies that is based on the potential backup policy update.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 4B shows a diagram of an example frame showing a graphic user interface in accordance with one or more embodiments of the invention.

FIG. 4C shows a diagram of an example frame showing a graphic user interface in accordance with one or more embodiments of the invention.

DETAILED DESCRIPTION

Figure 1A:
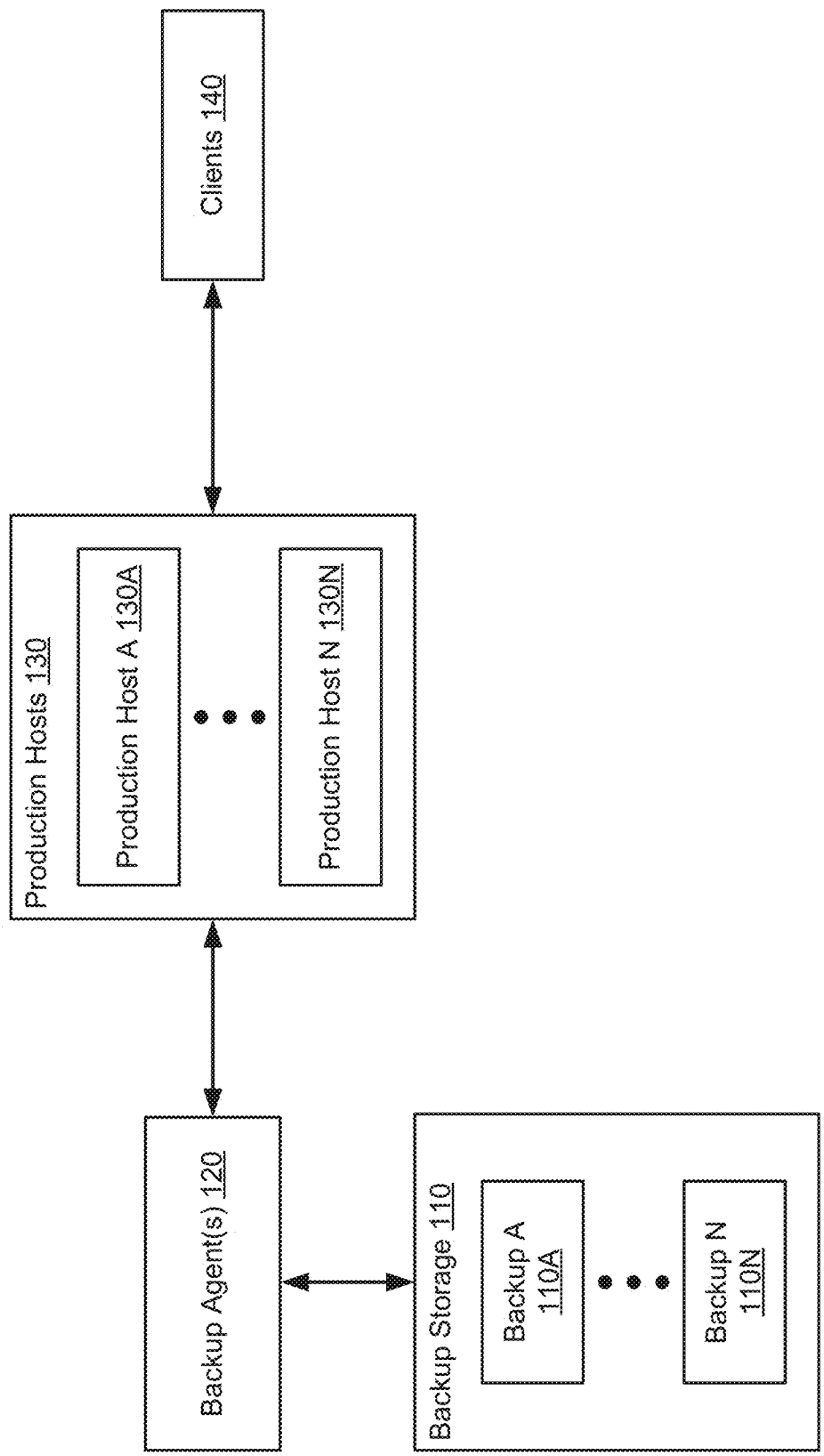
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for improving the reliability of storing data in a network environment. The data may be, for example, a backup of a virtual machine, or a portion thereof, hosted by a computing device. The backup may be used to restore the virtual machine to a predetermined state. The reliability of generating backups may be improved by facilitating identification of backup workflows that reduce the likelihood of being able to utilize previously stored data for restoration purposes.

In one or more embodiments of the invention, a backup policy may be information that specifies when, how, and what backups are generated, e.g., a backup workflow. Misconfiguration of a backup policy may prevent the data stored via the backup workflows to be used for restoration purposes. A backup policy may be misconfigured, for example, when it specifies that backups are to be generated too infrequently or too frequently. Generating backups too infrequently may result in a lack of available backups in the event of a restoration of a virtual machine. Generating backups too frequently may result in misuse of computing resources of a computing device performing the backup generation.

In one or more embodiments of the invention, the system may provide graphic user interface that enables a user to both visualize and reconfigure back policies to meet data reliability goals. The graphic user interface may be used to visualize backups of virtual machines stored in backup storages. A backup of a virtual machine may include, for example, an image of the virtual machine, a difference disk of the virtual machine, or another data structure that may be used to recover a predetermined state of a virtual machine. The backup may include other types of data without departing from the invention. The data may include data other than a backup of a virtual machine, without departing from the invention.

In one or more embodiments of the invention, the graphic user interface displays predictions of how changes to backup policies would have resulted in the generation of backups in the past. Displaying the predicted past backups may enable a user to identify whether the current backup policy settings meet data integrity goals and select new settings to remediate backup policies that do not meet data integrity goals.

In one or more embodiments of the invention, the graphic user interface improves the operation of a computing device that performs backup generations by allowing a user to more efficiently identify issues with backup policies.

FIG. 1A shows a diagram of a system in accordance with one or more embodiments of the invention. The system may include backup agent(s) (120), a backup storage (110) with one or more backups (110A, 110N), production hosts (130), and clients (140). Each of the components of the system may be operably connected to each other using any combination and quantity of wired and/or wireless networks. Each component of the system is discussed below.

In one or more embodiments of the invention, the backup agent(s) (120) orchestrate the storage of data. The data may be, for example, backups (110A, 110N) stored in the backup storage (110).

The backup agent(s) (120) may use the backups (110A, 110N) to generate graphical representations of the backups (110A, 110N). The graphical representations may be utilized by, for example, the clients (140) or other entities.

In one or more embodiments of the invention, the backup agent(s) (120) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent(s) (120) described throughout this application and/or all, or a portion thereof, of the methods illustrated in FIGS. 5A-5D. For additional details regarding computing devices, See FIG. 7.

In one or more embodiments of the invention, the backup agent(s) (120) are implemented as a logical device. The logical device may utilize the computing resources of any number of computing devices and thereby provide the functionality of the backup agent(s) (120) described throughout this application and/or all, or a portion thereof, of the methods illustrated in FIGS. 5A-5D. For additional details regarding the backup agent(s) (120), See FIG. 2.

In one or more embodiments of the invention, the backup storage (110) stores data and/or provides stored data. The data may be, for example, backups (110A, 110N). The backups (11A, 110N) may be representations of data generated by the production hosts (130). The backup storage (110) may obtain the backups (10A, 110N) from the backup agent(s) (120) and/or from the production hosts (130). The backup storage (110) may store additional data without departing from the invention.

The stored backups (110A, 110N) may be used to restore virtual machines to prior states, as will be discussed in greater detail with respect to FIG. 1B. In some scenarios, multiple backups, e.g., a chain of backups, may be required to restore a virtual machine to a desired state. If a backup in a chain is not present, the virtual machine may not be able to be restored to the desired state.

In one or more embodiments of the invention, a backup chain includes any number of backups that each depend on other backups of the chain and/or are dependent on by another backup in the number of backups. A backup chain may include a primary backup and one or more dependent backups. A primary backup may be a backup that does not require other backups to complete a restoration of a virtual machine to a predetermined state. In other words, a primary backup may be a complete backup. In contrast, a dependent backup may require additional backups in order to complete a restoration of the virtual machine to a predetermined state. Therefore, the dependent backup may depend on the additional backups. For example, a dependent backup may require a primary backup to exist to restore a virtual machine to a state associated with the dependent backup.

In one or more embodiments of the invention, dependent backups are further classified according to a respective depth of the dependent backups in the backup chain. A respective depth may be a measurement of how many backups are required to complete a restoration of a virtual machine to a predetermined state.

For example, a dependent backup may be a secondary backup. A secondary backup may be a dependent backup that only depends on a primary backup for completion of a restoration of a virtual machine. A secondary backup may be, for example, a partial backup. A tertiary backup may be a dependent backup that depends on a secondary backup. A tertiary backup may be, for example, a sub-partial backup. The tertiary backup may require two additional backups (i.e. the primary and secondary backups) in order to perform a complete restoration of a virtual machine. A secondary backup may require a one additional backup (i.e. the primary backup) in order to perform a complete restoration of the virtual machine. Therefore, a tertiary backup may have a larger respective depth in the backup chain than a secondary backup. The dependent backups may be additional backups having any respective depth without departing from the invention.

In one or more embodiments of the invention, the backup storage (110) is implemented as a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage (110) described throughout this application and/or all, or a portion thereof, of the methods illustrated in FIGS. 5A-5D. For additional details regarding computing devices, See FIG. 7.

In one or more embodiments of the invention, the backup storage (110) is implemented as a logical device. The logical device may utilize the computing resources of any number of computing devices and thereby provide the functionality of the backup storage (110) described throughout this application and/or all, or a portion thereof, of the methods illustrated in FIGS. 5A-5D.

In one or more embodiments of the invention, the production hosts (130A, 130N) store data in and/or retrieve stored data from the backup storage (110). The stored data may be, for example, a backup (110A, 110N) of a portion of the data stored in the production hosts (130A, 130N). The production hosts (130A, 130N) may store data in the backup storage (100) to, for example, store a representation of the data for data integrity purposes.

In one or more embodiments of the invention, the production hosts (130A, 130N) are implemented as computing devices. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the production hosts (130A, 130N) described throughout this application. For additional details regarding computing devices, See FIG. 7.

In one or more embodiments of the invention, the production hosts (130A, 130N) are implemented as logical devices. A logical device may utilize the computing resources of any number of computing devices and thereby provide the functionality of the production hosts (130A, 130N) discussed throughout this application and/or all, or a portion thereof, of the methods illustrated in FIGS. 5A-5D. For additional details regarding production hosts, See FIG. 1B.

In one or more embodiments of the invention, the clients (140) interact with the production hosts (130). The clients (140) may utilize and/or interact with applications hosted by the production hosts (130).

In one or more embodiments of the invention, the clients (140) are implemented as computing devices. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the clients (140) described throughout this application. For additional details regarding computing devices, See FIG. 7.

In one or more embodiments of the invention, the clients (140) are implemented as logical devices. A logical device may utilize the computing resources of any number of computing devices and thereby provide the functionality of the clients (140) discussed throughout this application and/or all, or a portion thereof, of the methods illustrated in FIGS. 5A-5D.

While the system of FIG. 1A has been illustrated as including a limited number of components for the sake of brevity, the system may include additional components (not shown), fewer components, and/or different components (not shown) without departing from the invention.

Figure 1B:
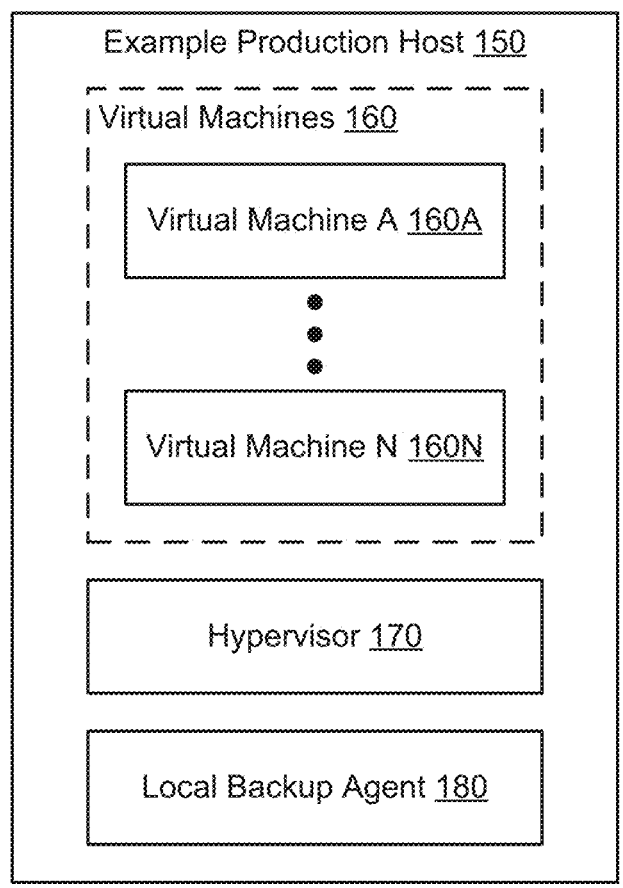
FIG. 1B shows a diagram of an example production host in accordance with one or more embodiments of the invention.
Figure 2:
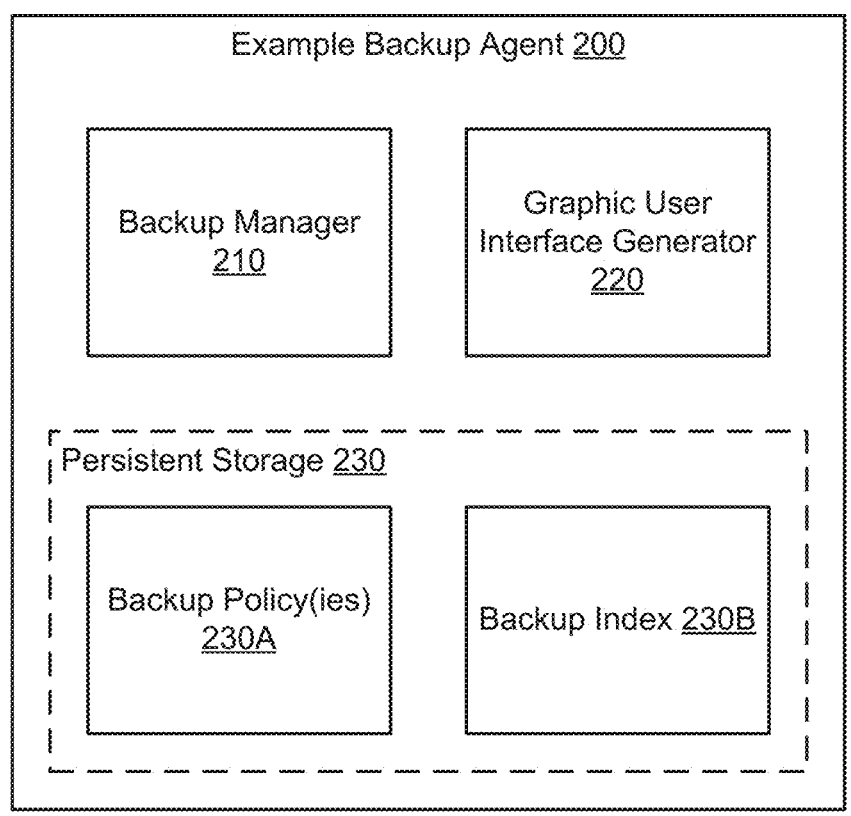
FIG. 2 shows a diagram of an example backup agent in accordance with one or more embodiments of the invention.

To further clarify embodiments of the invention, FIGS. 1B-2 show diagrams of examples of components of the system of FIG. 1A.

FIG. 1B shows a diagram of an example production host (150) in accordance with one or more embodiments of the invention. The example production host (150) may be similar to the production hosts (130A, 130N) discussed above.

In one or more embodiments of the invention, the example production host (150) hosts virtual machines (160).

The virtual machines (160) may be logical entities executed using computing resources of the example production host (150) and/or other computing devices. Each of the virtual machines (160A, 160N) may be executing similar or different processes.

In one or more embodiments of the invention, the processes executed by the virtual machines (160) provide services to users (not shown). The virtual machines (160) may execute processes such as, for example, hosting instances of databases, email servers, and/or other applications. The virtual machines (160) may host other types of applications without departing from the invention.

In one or more of embodiments of the invention, the virtual machines (160A, 160N) are implemented as computer instructions, e.g., computer code, stored on a persistent storage that when executed by a processor of the example production host (150) cause the example production host (150) to provide the functionality of the virtual machines (160A, 160N) described throughout the application and/or all or a portion of the methods illustrated in FIGS. 5A-5D.

In one or more embodiments of the invention, the example production host (150) includes a hypervisor (170) that orchestrates the operation of the virtual machines (160). The example production host (150) may orchestrate the operation of the virtual machines (160A, 160N) by allocating computing resources to each virtual machine (160A, 160N) via the hypervisor (170).

In one or more embodiments of the invention, the hypervisor (170) is implemented as computer instructions, e.g., computer code, stored on a persistent storage that when executed by a processor of the example production host (150) cause the example production host (150) to provide the functionality of the hypervisor (170) described throughout the application and/or all or a portion of the methods illustrated in FIGS. 5A-5D.

In one or more embodiments of the invention, the hypervisor (170) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (170) described throughout this application and/or all or a portion of the methods illustrated in FIGS. 5A-5D.

In one or more embodiments of the invention, the example production host (150) includes a local backup agent (180) that stores backups of the virtual machines (160) in a backup storage and/or performs restorations of the virtual machines using backups stored in the backup storage.

In one or more embodiments of the invention, the local backup agent (180) is implemented as computer instructions, e.g., computer code, stored on a persistent storage that when executed by a processor of the example production host (150) cause the example production host (150) to provide the functionality of the local backup agent (180) described throughout the application and/or all or a portion of the methods illustrated in FIGS. 5A-5D.

In one or more embodiments of the invention, the local backup agent (180) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the local backup agent (180) described throughout this application and/or all or a portion of the methods illustrated in FIGS. 5A-5D.

FIG. 2 shows a diagram of an example backup agent (200) in accordance with one or more embodiments of the invention. The example backup agent (200) may be the same as the backup agent(s) (120, FIG. 1) discussed above. As discussed above, the example backup agent (200) may orchestrate the storage of data in a backup storage. The example backup agent (200) may do so based on backup policies (230A), discussed below. Additionally, the example backup agent (200) may generate graphical representations of the backups and/or representations of how the backups would have been generated if a backup policy had been configured differently.

To provide the aforementioned functionality, the example backup agent (200) may include a backup manager (210), a graphic user interface generator (220), and a persistent storage (230). The persistent storage (230) may store data structures utilized by the backup manager (210) and/or the graphic user interface generator (220). Each component of the example backup agent (200) is discussed below.

In one or more embodiments of the invention, the backup manager (210) initiates storage of data from production hosts. The backup manager (210) may use one or more backup policies (230A) to determine when data is to be stored, for which production host to store data, and a storage location for the data.

In one or more embodiments of the invention, the backup manager (210) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (210) described throughout this application and/or all or a portion of the methods illustrated in FIGS. 5A-5D.

In one or more embodiments of the invention, the backup manager (210) is implemented as computer instructions (e.g. computer code) stored on a persistent storage that when executed by a processor of the example backup agent (200) that cause the example backup agent (200) to provide the functionality of the backup manager (210) described throughout this application and/or all or a portion of the methods illustrated in FIGS. 5A-5D.

In one or more embodiments of the invention, the graphic user interface generator (220) generates frames that graphically display backups, their relationships to other backups, and/or other characteristics of the backups. In one or more embodiments of the invention, a frame is an image displaying the graphic user interface. The graphic user interface generator (220) may use data structures found in the persistent storage (230), such as, for example, backup policy(ies) (230A) and/or a backup index (230B), to generate the frames. Information found in the aforementioned data structures may be graphically represented in the generated frames.

In one or more embodiments of the invention, the frames are displayed to a user on a local display. In other words, the computing device hosting the graphic user generator may include a display (e.g. a screen) to display the frames generated by the graphic user interface generator.

In one or more embodiments of the invention, the frames are transmitted to another computing device and displayed on a display of the other computing device.

In one or more embodiments of the invention, the graphical user interface generator (220) generates a dependency graph. A dependency graph may be a data structure that relates backups to their dependencies. The dependency graph may include any number of backup chains. As discussed above, backup chains may include any number of backups that depend on and/or are depended on by other backups in the number of backups.

In one or more embodiments of the invention, the graphic user interface generator uses the dependency graph to generate the frames displaying the graphic user interface. For additional details regarding the dependency graph, See FIG. 3C. For additional details regarding the frames, See FIGS. 3D-4C.

In one or more embodiments of the invention, the graphic user interface generator (220) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the graphic user interface generator (220) described throughout this application and/or all or a portion of the methods illustrated in FIGS. 5A-5D.

In one or more embodiments of the invention, the graphic user interface generator (220) is implemented as computer instructions (e.g. computer code) stored on a persistent storage that when executed by a processor of the example backup agent (200) that cause the example backup agent (200) to provide the functionality of the graphic user interface generator (220) described throughout this application and/or all or a portion of the methods illustrated in FIGS. 5A-5D.

As discussed above, the backup manager (210) and the graphic user interface generator (220) may use data structures stored in the persistent storage (230). In one or more embodiments of the invention, the persistent storage (230) stores data and may be, for example, hard disk drives, solid state drives, tape drives, or any combination thereof. The persistent storage (230) may be other types of digital storage without departing from the invention. The persistent storage (230) may be virtualized without departing from the invention.

The data structures stored in the persistent storage (230) may include one or more backup policies (230A) and a backup index (230B). The persistent storage (230) may include additional, fewer, and/or different data structures without departing from the invention. Each of the aforementioned data structures is discussed below.

The backup policy(ies) (230A) may be data structures that specify when, what, and how data is stored in a backup storage. For example, the backup policy(ies) (230A) may specify a virtual machine from which the data originates, a frequency in which the data is to be stored, and a storage location for storage of the data. For additional details regarding the backup policy(ies) (230A), See FIG. 3B.

The backup index (230B) may be a data structure that specifies information about data stored in a backup storage. The information may include identifiers of the backups in the backup storage and the relationships between the backups. The information may be used by the graphic user interface generator (220) when generating frames. For additional details regarding the backup index (230B), See FIG. 3A.

Figure 3A:
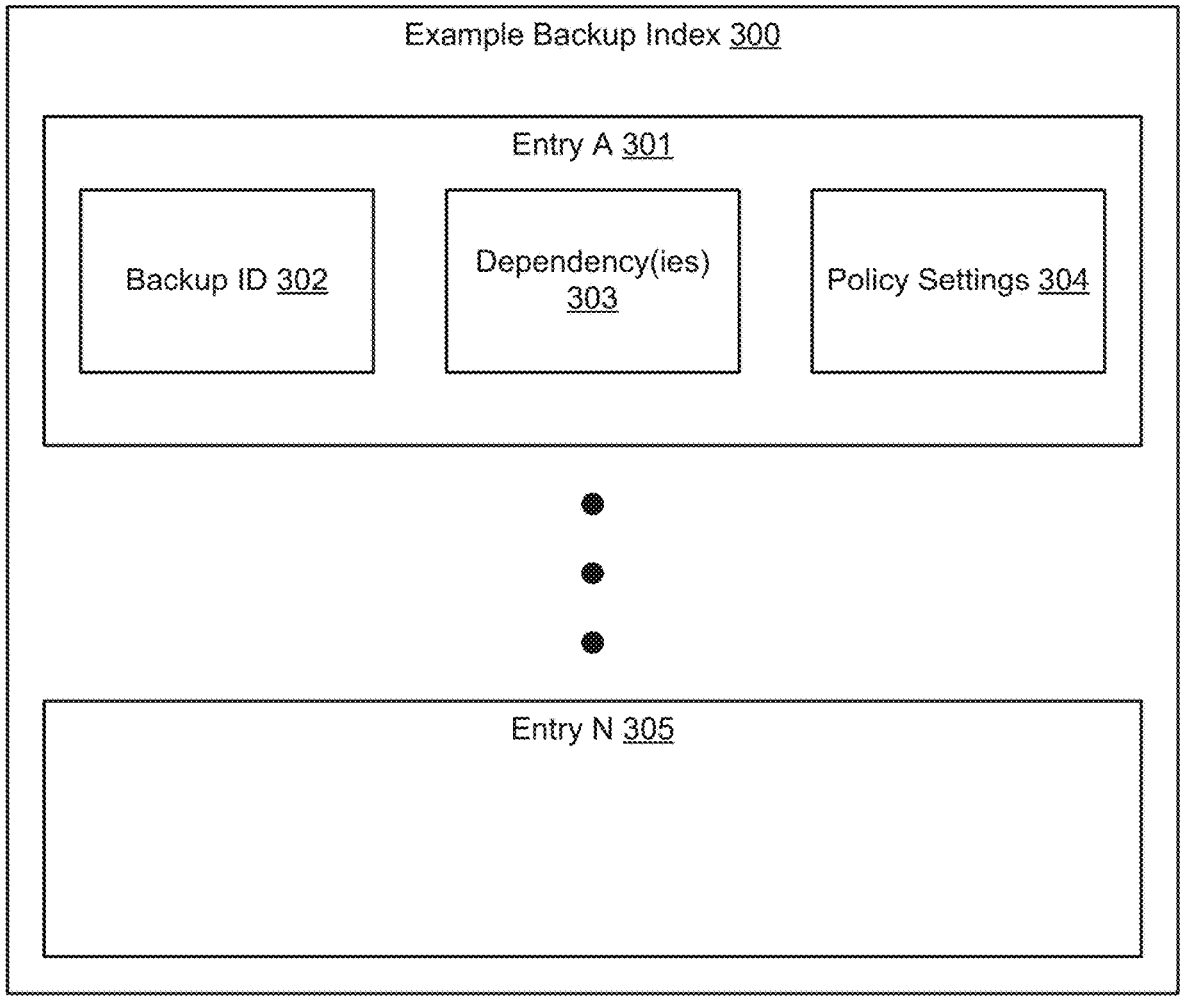
FIG. 3A shows a diagram of an example backup index in accordance with one or more embodiments of the invention.

As discussed above, the graphic user interface generator may use a backup index to generate frames. FIG. 3A shows a diagram of an example backup index (300) in accordance with one or more embodiments of the invention. The example backup index (300) may be similar to the backup index (230B, FIG. 2) discussed above.

In one or more embodiments of the invention, the example backup index (300) includes information about backups stored in a backup storage. The example backup index may include a number of entries (301, 305). Each entry may include a backup identifier (302), one or more dependency(ies) (303), and policy settings (304). Each portion of the example backup index is discussed below.

In one or more embodiments of the invention, the backup identifier (302) specifies a backup associated with the entry (301). The backup may be stored in a backup storage (e.g., 110, FIG. 1). The backup identifier may be, for example, a file name, a sequential number, and/or other identifiers without departing from the invention.

In one or more embodiments of the invention, the dependency(ies) (303) specify a dependency of the backup specified by the backup identifier (302). The dependency(ies) (303) may specify one or more backups in a backup storage that the backup specified by the backup identifier (302) depends on. A second backup may depend on a first backup when the second backup cannot be used to restore a virtual machine to a previous state without the first backup. The second backup may be, for example, a difference disk that only includes changes in data since the first backup was generated. Since only changes to data cannot be used to restore a virtual machine to a state without knowing a state in which the virtual machine was at the start of the changes to the data, such a backup is dependent on another backup that reflects the state of the virtual machine at a point in time.

In one or more embodiments of the invention, the policy settings (304) specify characteristics of a backup policy that the backup specified by the backup identifier (302) implemented at the time the backup specified by the backup ID was generated. Policy settings (304) of the backup identifier (302) may specify, for example, a virtual machine that generated the data stored in the backup, a frequency that the backup was generated, and a backup storage in which the backup was stored.

Figure 3B:
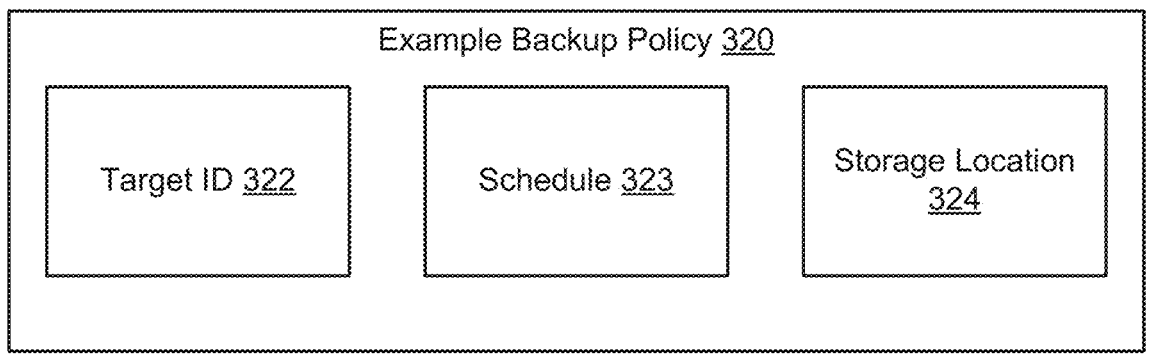
FIG. 3B shows a diagram of an example backup policy in accordance with one or more embodiments of the invention.

FIG. 3B shows a diagram of an example backup policy (320) in accordance with one or more embodiments of the invention. The example backup policies (320) may be similar to the backup policies of the backup policy(s) (230A, FIG. 2) discussed above.

In one or more embodiments of the invention, the example backup policy (320) includes information that defines a backup generation workflow. The example backup policy (320) may include a target ID (322), a schedule (323), and a storage location (324). Each portion of the example backup policy (320) is discussed below.

In one or more embodiments of the invention, the target ID (322) specifies any number of entities for which the backup policy generates backups. The entities may be, for example, computing devices, virtual machines, and/or other entities without departing from the invention. The target ID (322) may be, for example, a sequential number specifying the entities. The target ID (322) may be other types of identifiers without departing from the invention.

In one or more embodiments of the invention, the schedule (323) specifies when a backup is to be generated. The schedule (323) may be a frequency at which a backup is generated. For example, a schedule (323) may specify that a backup be generated on a daily basis. The schedule (323) may specify when backups are generated using different metrics without departing from the invention.

In one or more embodiments of the invention, the storage location (324) specifies where the backup is stored. The backup may be stored, for example, in a backup storage.

Figure 3C:
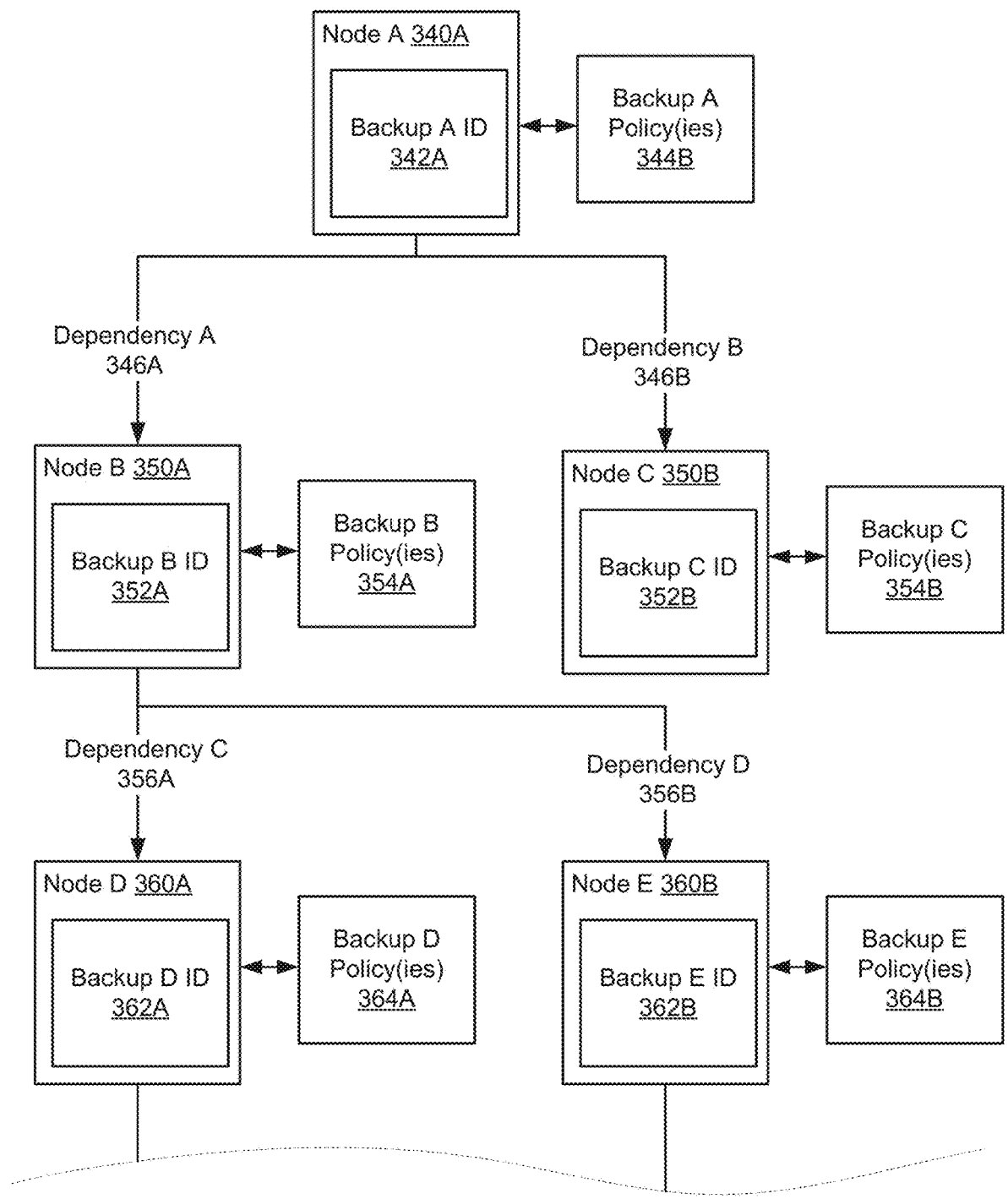
FIG. 3C shows a diagram of an example dependency graph in accordance with one or more embodiments of the invention.

As discussed above, a backup agent may generate a dependency graph to be used to generate frames. FIG. 3C shows a diagram of an example dependency graph in accordance with one or more embodiments of the invention. The example dependency graph may be an in-memory data structure. The dependency graph, or copies thereof, may be stored in non-transitory storage without departing from the invention. The example dependency graph may include a backup chain comprising of nodes (340A, 350A, 350B, 360A, 360B) that represent a backup in the backup chain and their dependencies (346A, 346B, 356A, 356B) to other nodes (340A, 350A, 350B, 360A, 360B). Each node may include a backup ID (342A, 352A, 352B, 362A, 362B) and be associated with respective backup policies (344A, 354A, 354B, 364A, 364B).

In one or more embodiments of the invention, a backup ID (342A, 352A, 352B, 362A, 362B) identifies a backup associated with the respective node (340A, 350A, 350B, 360A, 360B).

In one or more embodiments of the invention, backup policies (344A, 354A, 354B, 364A, 364B) associated with a node (340A, 350A, 350B, 360A, 360B) are policies that were implemented by a backup agent to generate the respective backup. For example, backup A policy(ies) (344B) may be policies implemented by a backup agent to generate the backup corresponding to node A (340A).

In one or more embodiments of the invention, node A (340A) represents a primary backup. As discussed above, a primary backup may be a backup that does not depend on other backups in order to complete a restoration. However, node A (340A) may be depended on by nodes B and C (350A, 350B). The dependencies of nodes B and C (350A, 350B) to node A (340A) may be illustrated through dependencies A and B (346A, 346B), respectively. Because of their dependencies to a primary backup, nodes B and C (350A, 350B) may represent secondary backups. Additionally, nodes D and E may represent tertiary backups because of their respective dependencies (356A, 356B) to a secondary backup (i.e. node B (350A)).

A dependency (346A, 346B, 356A, 356B) may be illustrated as an arrow pointing from a first node to a second node that depends on the first node. For example, dependency A (346A) may show the dependency of node B (350A) to node A (340A).

Figure 3D:
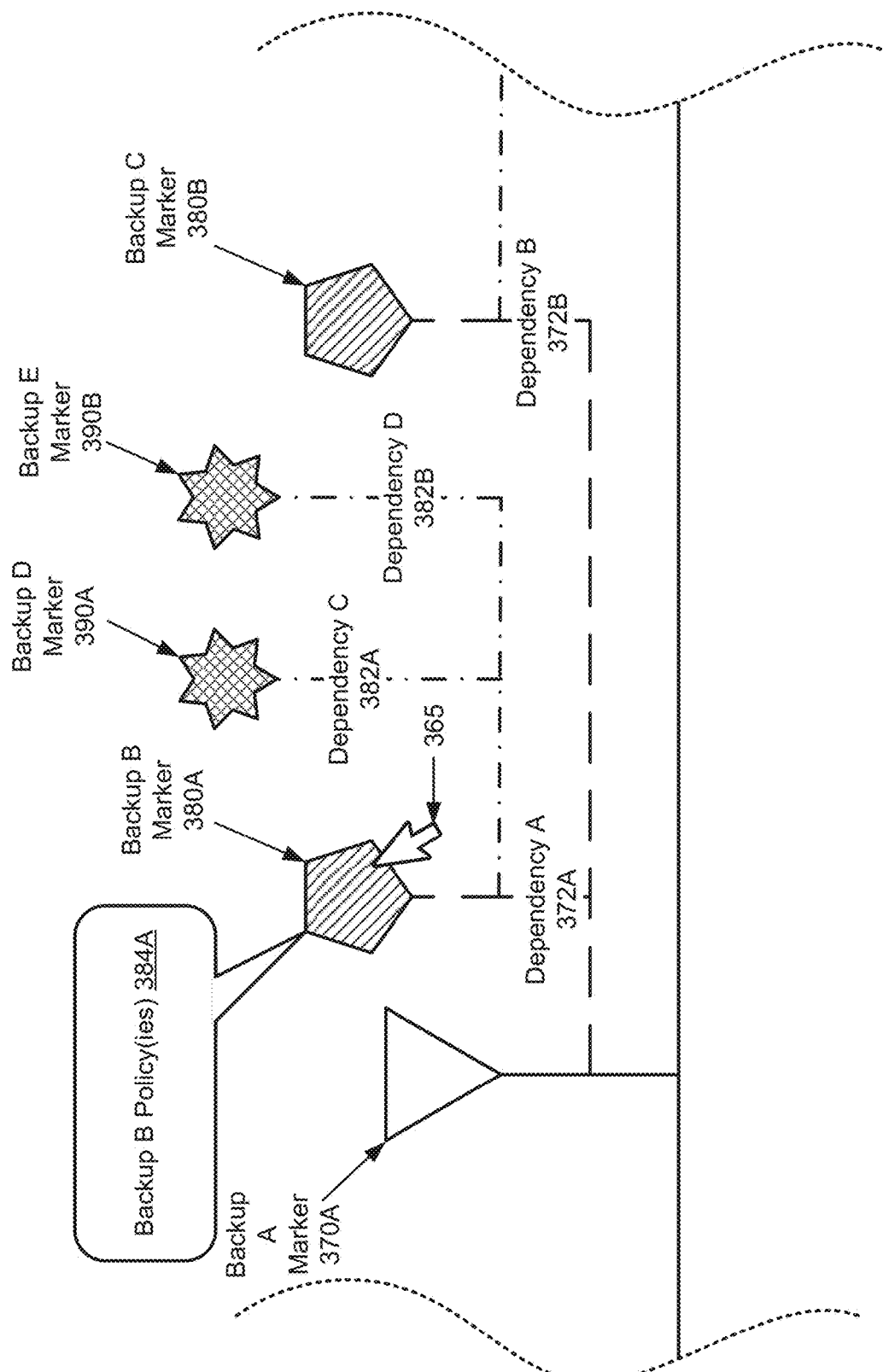
FIG. 3D shows a diagram of an example frame showing a graphic user interface in accordance with one or more embodiments of the invention.

As discussed above, the graphic user interface generator may use a dependency graph to generate frames. FIG. 3D shows a diagram of an example frame showing a graphic user interface in accordance with one or more embodiments of the invention. The frame may include graphical elements that each represents a portion of the example dependency graph of FIG. 3C. A graphical element may be a portion of the graphical user interface. The graphical elements may include backup markers (370A, 380A, 380B, 390A, 390B), dependencies (372A, 372B, 382A, 382B), and one or more backup policy(ies) (384A). Each graphical element of FIG. 3D is discussed below.

In one or more embodiments of the invention, the backup markers (370A, 380A, 380B, 390A, 390B) are graphical elements that display a node from the example dependency graph. Each backup marker (370A, 380A, 380B, 390A, 390B) may correspond to a node in the dependency graph. For example, backup A marker (370A) may display node A (340A, FIG. 3C) of the dependency graph, backup B marker may display node B (350A, FIG. 3C) of the dependency graph, etc.

In one or more embodiments of the invention, dependencies (372A, 372B, 382A, 372B) are graphical elements that represent a dependency between backups. Each dependency (372A, 372A, 382A, 382B) may be a line segment that connects backup markers (370A, 380A, 380B, 390A, 390B) according to the dependencies illustrated in the dependency graph. For example, dependency A (372A) may connect backup B marker (380A) to backup A marker (370A) because node B (350A, FIG. 3C) is dependent on node A (340A) according to dependency A (346A) of the dependency graph.

In one or more embodiments of the invention, the backup markers (370A, 380A, 380B, 390A, 390B) are user interactive markers. In other words, the backup markers (370A, 380A, 380B, 390A, 390B) display additional information as a user interacts with the backup markers (370A, 380A, 380B, 390A, 390B). A user interaction may include, for example, a user commanding a pointer (365) to be collocated with a backup marker (370A, 380A, 380B, 390A, 390B). A pointer (365) may be a graphical element, commanded by a user, which allows the user to interact with other graphical elements of the graphic user interface. The user may command the pointer (365) to select the backup marker (370A, 380A, 380B, 390A, 390B). Other user interactions may occur without departing from the invention.

In one or more embodiments of the invention, the user interaction may prompt the graphic user interface to generate a display of backup policies. The user interaction may be, for example, the pointer (365) being collocated with the backup B marker (380A). The user interaction may prompt a window to be displayed. The window may display the Backup B Policy(ies) (384A).

In one or more embodiments of the invention, the graphic user interface shown in FIG. 3D is generated by a backup agent (e.g., 200, FIG. 2). The backup agent may utilize the information of a generated dependency graph to generate frames showing the graphic user interface. For additional details regarding the graphic user interface, See FIGS. 4A-4C.

Figure 4A:
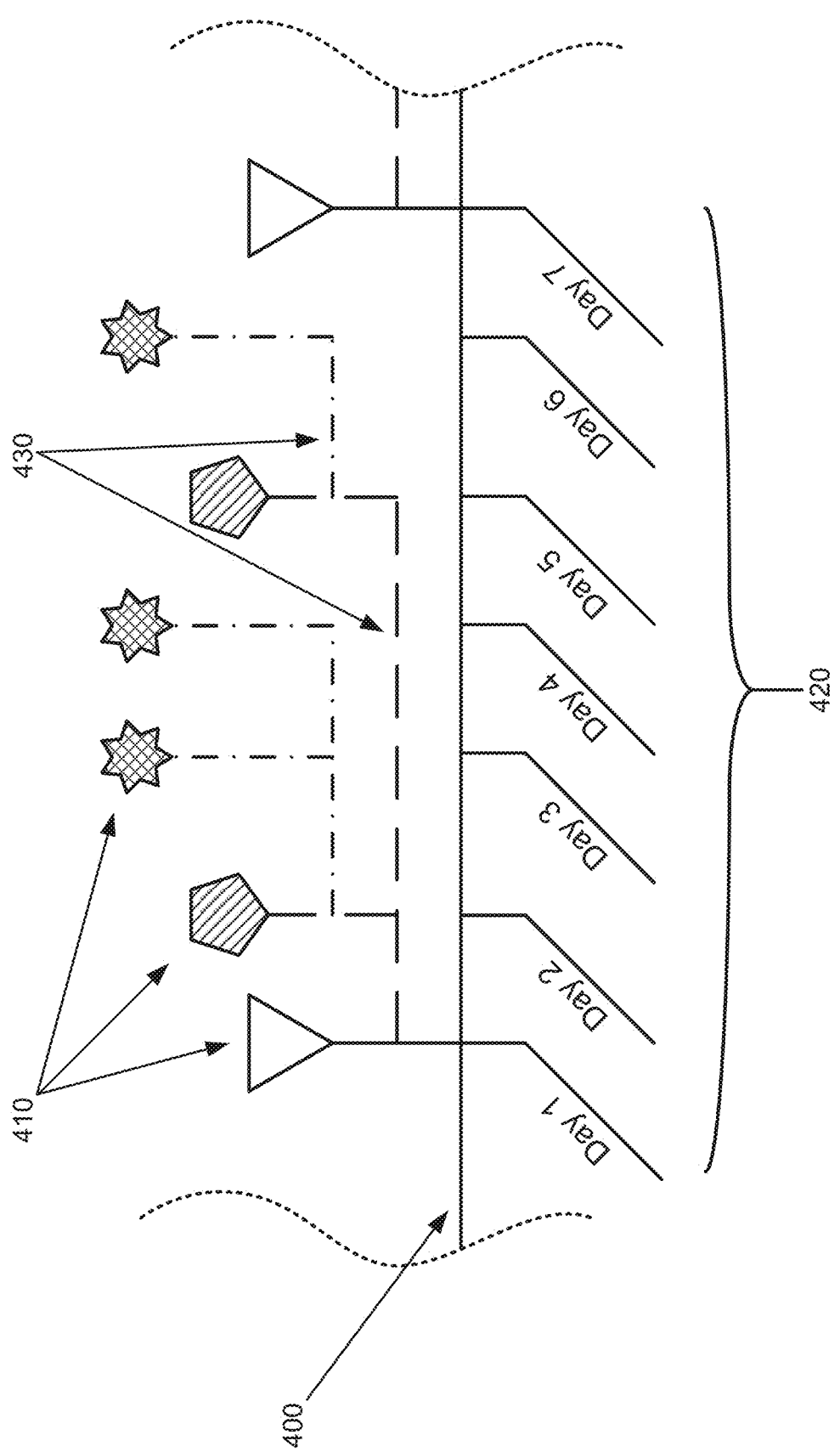
FIG. 4A shows a diagram of an example frame showing a graphic user interface in accordance with one or more embodiments of the invention.

FIG. 4A shows a diagram of a frame showing a graphic user interface in accordance with one or more embodiments of the invention. The frame may display a time frame for generated backups of a virtual machine over a period of time. The frame may include graphical elements such as a timeline (400), date markers (420), backup markers (410), and dependency branches (430). Each graphical element is discussed below.

In one or more embodiments of the invention, the timeline (400) is a horizontal line placed near the center of the frame. The timeline may include date markers (420) placed along the timeline (400). The date markers (420) may represent time periods in which backups of a virtual machine are generated. The date markers (420) may be placed on the timeline (400) in an order of a date marker with the first time period (e.g. Day 1) on the leftmost side and each time period directly following placed a unit of space to the right of the prior time period. As a result, the date markers (420) may be placed in chronological order along the timeline (400).

In one or more embodiments of the invention, backup markers (410) represent backups of the virtual machine. Each backup marker (410) may be displayed as a shape above the timeline (400) with visual characteristics that represent types of backups represented by the backup marker (410). In other words, the visual characteristics allow a user to discriminate between different types of backups.

The visual characteristics may include, for example, a type of shape, a color of the shape, a size of the shape, a fill pattern of the shape, and/or other visual characteristics without departing from the invention. The types of backups may include, for example, complete backups, partial backups, and sub-partial backups. In FIG. 4A, a complete backup may be represented by a triangle, a partial backup may be represented by a pentagon with a striped fill pattern, and a sub-partial backup may be represented by a star with a cross-striped fill pattern.

As discussed above, a backup may be dependent on another backup. In one or more embodiments of the invention, the dependency branches (430) represent dependencies of the backups. A dependency branch (430) may connect a backup marker (410) to another backup marker (410) based on the dependency between the two backups. The types of backups connected by a dependency branch (430) may be represented by the visual characteristics of the dependency branch (430). Visual characteristics may include, for example, line color, line thickness, line pattern, and/or other visual characteristics without departing from the invention. For example, a dependency branch (430) connecting a triangle to a pentagon may have a dashed line pattern, a dependency branch (430) connecting a pentagon to a star may have a dashed-dotted line pattern, etc.

In one or more embodiments of the invention, backup markers may be located in a similar level to other backup markers of a same type of backup (i.e. primary, secondary, tertiary). A level may be a distance away from the timeline (400). For example, triangles in a graphic user interface may represent a primary backup. Therefore, each triangle in the graphic user interface may be a distance away from the timeline (400) similar to other triangles representing primary backups. In contrast, a pentagon representing a secondary backup may be a different distance away from the timeline (400) as the triangles. Pentagons representing secondary backups may be a similar distance away from the timeline (400) as each other.

FIG. 4B shows a diagram of a frame displaying the graphic user interface in accordance with one or more embodiments of the invention. The frame may be similar to the frame of FIG. 4A with graphical elements not illustrated in FIG. 4B for the sake of brevity. The frame shows the graphical elements of FIG. 4A with a pointer (440) interacting with a backup marker. The pointer may interact with the backup marker by, for example, being collocated with the backup marker, by being selected by the pointer, and/or any other interaction without departing from the invention. The interaction may trigger the graphic user interface to generate a display of backup policies (450) of the backup marker. The display of the backup policies may be an interactive overlay, such as, for example, a window, that includes field entries (not shown) corresponding to the backup policies that, when modified, generate changes to the graphic user interface. The changes may include, for example, adding graphical elements, removing graphical elements, or modifying backup policies associated with graphical elements. Other modifications may be performed without departing from the invention.

As discussed above, graphical elements may be modified in the graphic user interface. FIG. 4C shows a diagram of a frame displaying the graphic user interface in accordance with one or more embodiments of the invention. The frame may be similar to the frame of FIG. 4A with graphical elements not illustrated in FIG. 4C for the sake of brevity. The frame may display modifications to a backup marker (460) associated with a partial backup. The modifications may include displaying additional partial backup markers (490A, 490B, 490C). The additional partial backup markers (490A, 490B, 490C) may be generated in response to a user modification to the backup policies of the partial backup marker (460). The additional partial backup markers (460, 490A, 490B, 490C) may be dependent on a complete backup marker (470).

In one or more embodiments of the invention, the additional backup markers (490A, 490B, 490C) are generated to predict what would have happened had the user modifications to the backup policies been implemented prior to the generation of the partial backup associated with the backup marker (460).

As discussed above, backup agents (120, FIG. 1) may perform methods for generating a graphic user interface.

Figure 5A:
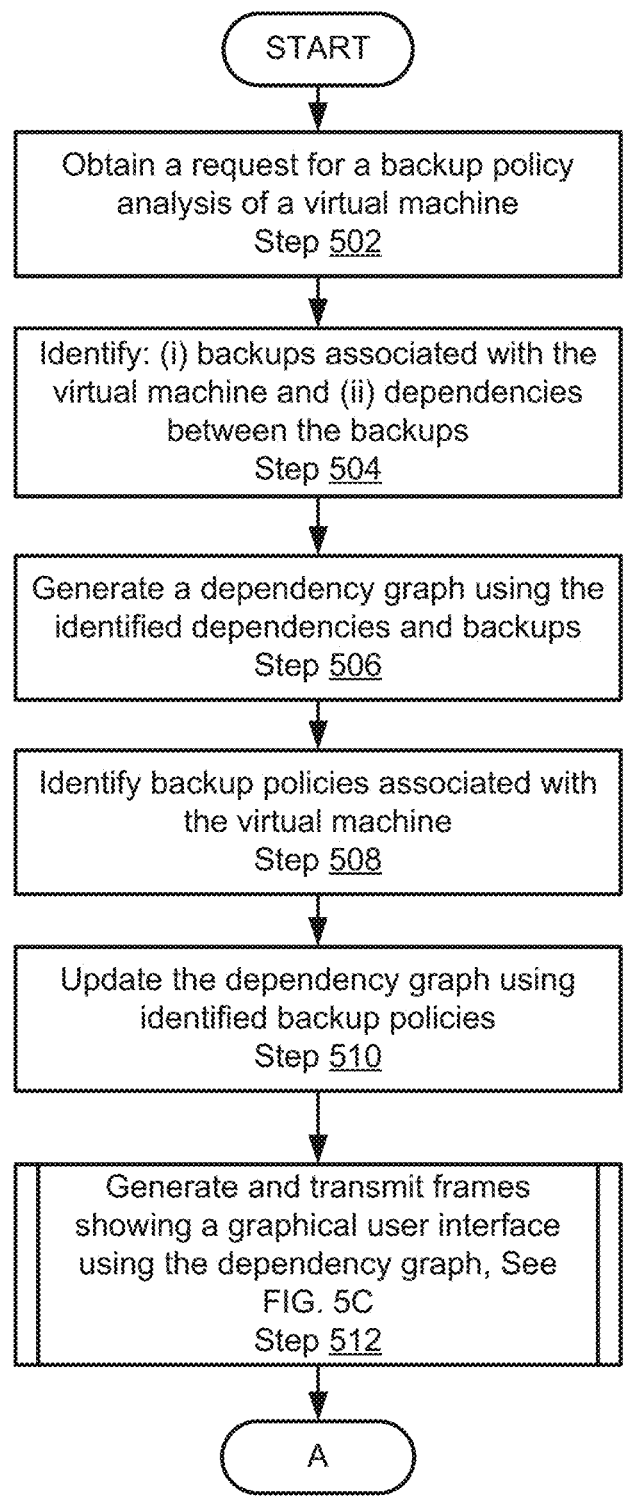
FIG. 5A shows a flowchart of a method for generating a graphic user interface in accordance with one or more embodiments of the invention.

FIG. 5A shows a flowchart of a method in accordance with one or more embodiments of the invention. The method depicted in FIG. 5A may be used to generate a graphic user interface in accordance with one or more embodiments of the invention. The method shown in FIG. 5A may be used by, for example, a backup agent (120, FIG. 1). Other components of the system illustrated in FIG. 1 may perform the method of FIG. 5A without departing from the invention.

In Step 502, a request for a backup policy analysis of a virtual machine is obtained.

In one or more embodiments of the invention, the obtained request is sent from a computing device. The computing device may be, for example, a client, a production host, a backup agent, and/or any other computing device without departing from the invention.

In one or more embodiments of the invention, the virtual machine is hosted by a production host (130, FIG. 1).

In Step 504, backups associated with the virtual machine and dependencies between the backups are identified in response to obtaining the backup policy analysis request.

In one or more embodiments of the invention, the backups may be identified via backup policies stored in a backup agent. The backup policies may include policies that identify a virtual machine, such as, for example, a target ID, and identify backups generated by implementing the backup policy corresponding to the virtual machine.

In one or more embodiments of the invention, the dependencies may be identified using the backup index. A backup agent may identify backups using backup identifiers in the backup index, and identify dependencies associated with each identified backups.

In Step 506, a dependency graph is generated using the identified dependencies and backups.

In one or more embodiments of the invention, the dependency graph is generated by identifying backups associated with the virtual machine. The identified backups may be, for example, complete backups, partial backups, or sub-partial backups. Other backups may be included without departing from the invention. The backups may depend on other backups when performing a restoration of the virtual machine. A backup agent may generate the dependency graph by generating nodes each corresponding to an identified backup. The backup agent may generate dependencies between the nodes according to dependencies of the respective backups. The backup agent may link the nodes using the generated dependencies.

In Step 508, backup policies associated with the virtual machine are identified.

In one or more embodiments of the invention, the backup policies are identified by identifying the backup policies that were implemented to generate the identified backups in the dependency graph.

In Step 510, the dependency graph is updated using the identified backup policies.

In one or more embodiments of the invention, the dependency graph is updated by adding the identified backup policies to the dependency graph. Each included backup policy may be associated with the backups that were generated based on the respective backup policy.

In Step 512, frames showing a graphic user interface are generated using the dependency graph.

In one or more embodiments of the invention, a frame a data structure. The data structure may include information that represents a visual depiction of the graphic user interface at a point in time. The frames may be generated by generating graphical elements each representing a portion of the generated dependency graph and placing them in predetermined locations.

In one or more embodiments of the invention, the frames are transmitted to the computing device that sent the request.

Figure 5B:
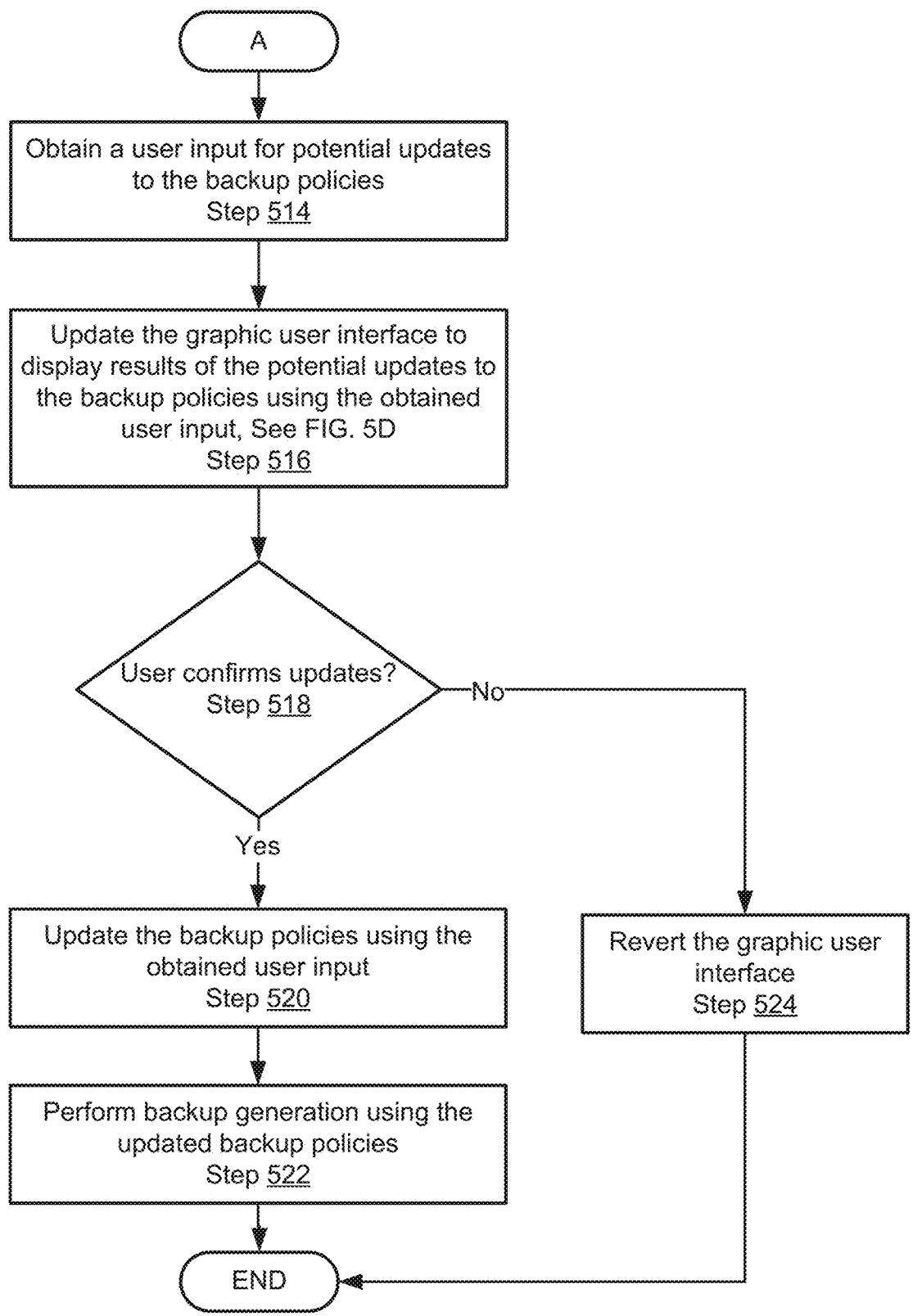
FIG. 5B shows a flowchart of a method for modifying the graphic user interface in accordance with one or more embodiments of the invention.
Figure 5C:
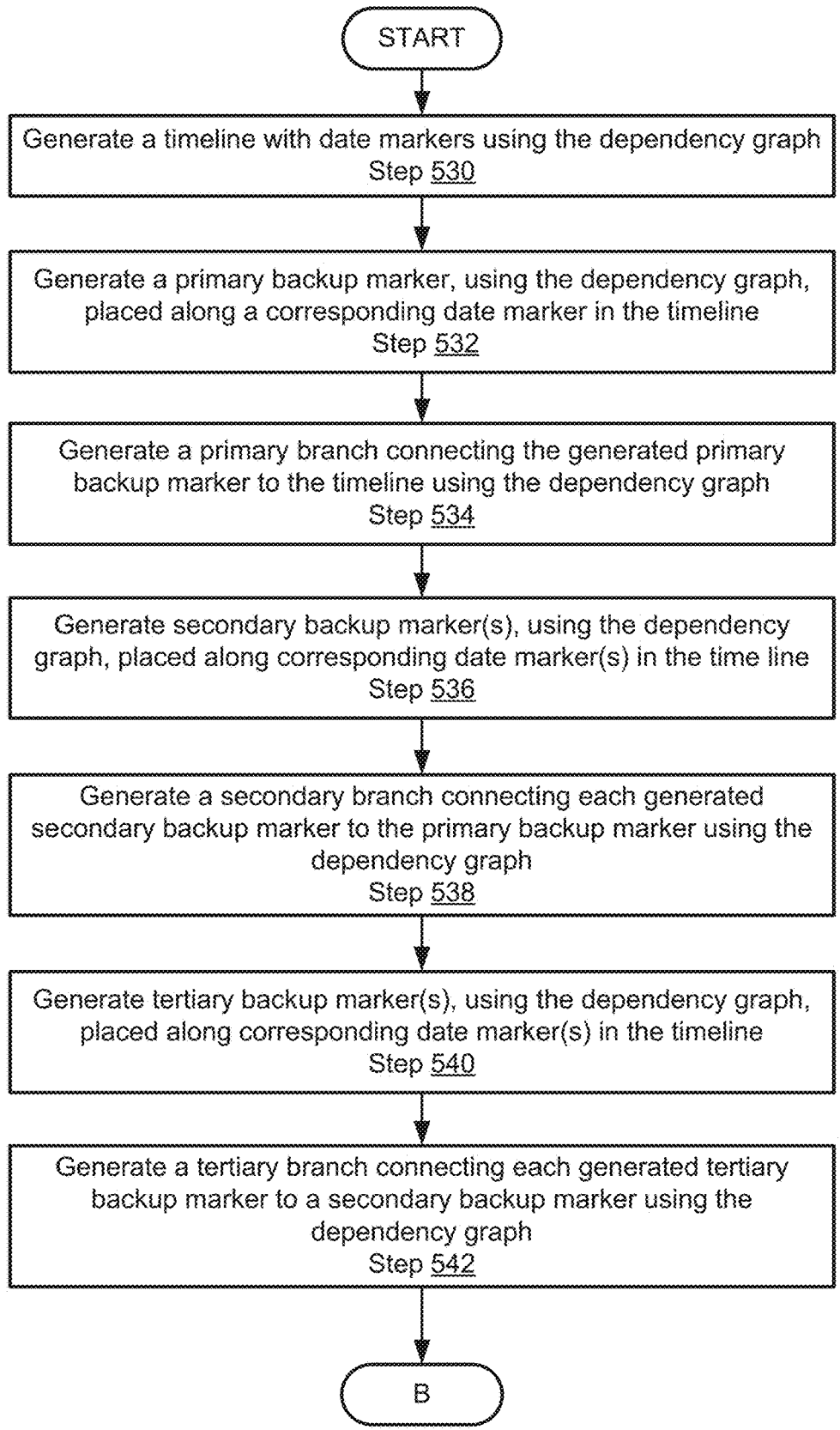
FIG. 5C shows a flowchart of a method for generating frames showing a graphic user interface in accordance with one or more embodiments of the invention.
Figure 5D:
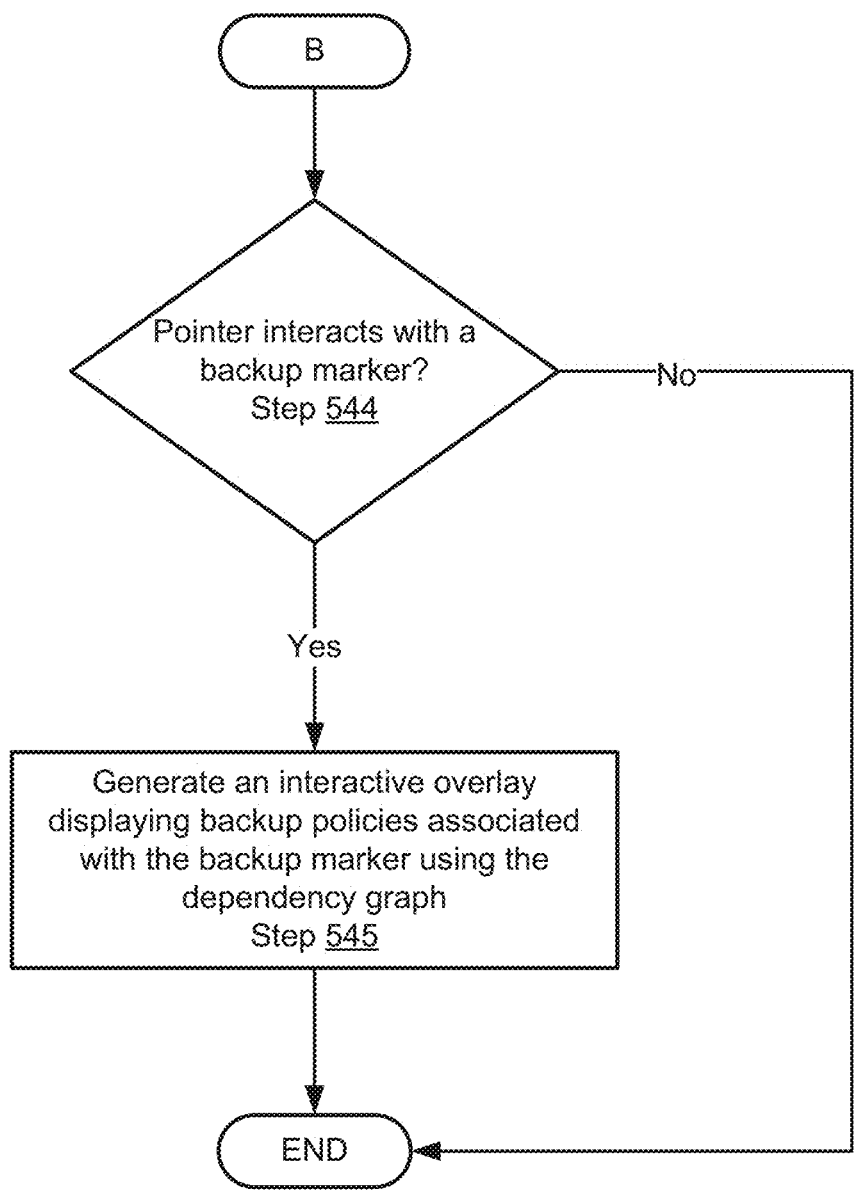
FIG. 5D shows a flowchart of a method for generating frames showing a graphic user interface in accordance with one or more embodiments of the invention.

In one or more embodiments of the invention, the frames are generated via the method illustrated in FIG. 5C-5D. The frames may be generated via other methods without departing from the invention.

The method may proceed to Step 514 of FIG. 5B following Step 512.

FIG. 5B shows a continuation of the flowchart of FIG. 5A.

Prior to step 514, the frame may be displayed to a user. The frame may be displayed on a display that is local to the backup agent or remote from the backup agent. In a scenario in which the display is remote, the frame may be sent to another computing device proximate to the user. The frame may be displayed to the user using the display of the computing device proximate to the user. In other words, the computing device proximate to the user may be used by the backup agent to: (i) display frames to a user and (ii) obtain input from the user when frames are displayed to the user.

In Step 514, a user input for potential updates to the backup policies is obtained.

In one or more embodiments of the invention, the user input is obtained by an interaction with a graphical element in the graphic user interface prompted by a user. The interaction may be, for example, a pointer, controlled by the user, moving toward and/or selecting a location of the graphical element. The interaction may prompt a display of backup policies associated with the graphical element.

In one or more embodiments of the invention, the display is a box with entry fields. Each entry field may correspond to a backup policy. The entry fields may be portions of the frame. The portions of the frame may be updated as the user inputs information.

In Step 516, the graphic user interface is updated, using the obtained user input, to display results of the potential updates to the backup policies.

In one or more embodiments of the invention, the potential updates to the backup policies prompt the graphic user interface to be modified. The modification of the graphic user interface may include adding, removing, and/or altering existing graphical elements in the graphic user interface according to the potential updates. The potential updates to the backup policies may include, for example, altering a schedule for the backup. The schedule may be a frequency in which the backup is generated. The change in schedule may prompt the graphic user interface to make predictions about the backups. For example, if the potential updates include increasing the frequency of the backup, the graphic user interface may generate additional graphical elements that follow the new frequency.

For example, if a schedule of a backup is modified, the backup marker representing the backup may be modified. The modifications may include optionally removing the backup marker, generating new backup markers, and placing the new backup markers in the graphic user interface to represent the modification in schedule. The new backup markers may represent potential backups that would be generated should the updated schedule be implemented. The new backup markers may have visual characteristics different from the optionally removed secondary backup marker. The different visual characteristics may include, for example, different outlines, different fills, different shapes, different colors, and/or other visual characteristics without departing from the invention.

In one or more embodiments of the invention, the new backup markers are placed in a level similar to that of the original backup. As discussed above, a level is a distance of a backup marker from the timeline. The level of placement of the backup markers may be determined according to the type of backup represented by the backup markers.

In one or more embodiments of the invention, dependency branches are generated according to dependencies of the potential backups. In other words, potential backups may depend on other backups, and dependency lines may be generated to represent the dependencies.

In Step 518, it is determined whether a user has confirmed the updates. If the user does confirm the updates, the method may proceed to Step 520. If the user does not confirm the updates, the method may proceed to Step 524.

In Step 520, the backup policies are updated using the obtained user input.

In one or more embodiments of the invention, the backup policies are updated by removing policies related to the user inputs and replacing them with the updated policies. For example, if a user updated a schedule of a backup, the existing schedule would be removed from the backup policies. The updated schedule may be used to replace the removed schedule.

In Step 522, backups are generated using the updated backup policies.

In one or more embodiments of the invention, the backup agent implements the updated backup policies for the backup of the virtual machine.

The method may end following Step 522.

In Step 524, the graphic user interface is reverted.

In one or more embodiments of the invention, the modifications to the graphic user interface are removed. In other words, the graphic user interface may display the graphic elements as they were displayed prior to the user modifying the backup policies.

As discussed above, backup agents (120, FIG. 1) may perform methods for generating frames showing a graphic user interface.

FIG. 5C shows a flowchart of a method in accordance with one or more embodiments of the invention. The method depicted in FIG. 5C may be used to generate frames showing a graphic user interface in accordance with one or more embodiments of the invention. The method shown in FIG. 5C may be used by, for example, a backup agent (120, FIG. 1). Other components of the system illustrated in FIG. 1 may perform the method of FIG. 5C without departing from the invention.

In Step 530, a timeline with date markers is generated using the dependency graph.

In one or more embodiments of the invention, the timeline is generated by generating a horizontal line spaced according to a size of a screen that displays the line. A width of the timeline may be similar to a width of the screen.

In one or more embodiments of the invention, date markers are generated and placed on the timeline. The date markers may be generated by (i) identifying a time period in which the identified backups are generated. (ii) partitioning the time period into partitioned time periods (e.g. days), (iii) generating a date marker corresponding to each partitioned time period. The date markers may be placed on the timeline in an order from oldest to newest partitioned time period starting on the left side and placing each subsequent date marker a predetermined space to the right.

In Step 532, a primary backup marker is generated.

In one or more embodiments of the invention, the primary backup marker is generated by identifying a graphical marker type associated with primary backups. The graphical marker type may be, for example, a shape with visual characteristics that distinguish primary backups from other backup types. Examples of the visual characteristics of the primary backup marker may include a type of shape, a color, a fill pattern, a fill shade, and/or other characteristics without departing from the invention.

In one or more embodiments of the invention, a location with respect to the timeline is identified. The identified location may be a point vertically aligned with a date marker corresponding to a partitioned time period in which the primary backup was generated. The identified location may be at a distance from the timeline that is unique to primary backups (i.e. at a predetermined level).

In one or more embodiments of the invention, a graphical marker of the identified graphical marker type is instantiated at the identified location.

In Step 534, a primary branch is generated connecting the generated primary backup marker to the timeline using the dependency graph.

In one or more embodiments of the invention, the primary branch is generated by identifying a graphical marker type associated with a primary backup. The identified graphical marker type may be, for example, a line segment with visual characteristics that distinguish the line segment from other graphical marker types. A graphical marker of the identified graphical marker type may be instantiated between the identified location of Step 534 and the nearest portion of the timeline.

In Step 536, secondary backup marker(s) are generated and placed along a corresponding date marker in the timeline using the dependency graph.

In one or more embodiments of the invention, the secondary backup marker(s) are generated by identifying a graphical marker type associated with secondary backups. The graphical marker type may be, for example, a shape with visual characteristics that distinguish secondary backups from other backup types (i.e. primary backups).

In one or more embodiments of the invention, a location with respect to the timeline is identified for each secondary backup marker. An identified location may be a point vertically aligned with a date marker corresponding to a partitioned time period in which a secondary backup was generated. The identified location(s) may be at a predetermined level that is unique to secondary backups.

In one or more embodiments of the invention, a graphical marker of the identified graphical marker type is instantiated at each of the identified locations.

In Step 538, a secondary branch is generated connecting each generated secondary backup marker to the primary backup marker using the dependency graph.

In one or more embodiments of the invention, the secondary branch(es) are generated by identifying a graphical marker type associated with a dependency between a secondary backup and a primary backup. The identified graphical marker type may be, for example, a line segment with visual characteristics that distinguish the line segment from other graphical marker types. A graphical marker of the identified graphical marker type may be instantiated between the identified location(s) of Step 536 and the primary backup marker.

In Step 540, tertiary backup marker(s) are generated and placed along a corresponding date marker in the timeline using the dependency graph.

In one or more embodiments of the invention, the tertiary backup marker(s) are generated by identifying a graphical marker type associated with tertiary backups. The graphical marker type may be, for example, a shape with visual characteristics that distinguish secondary backups from other backup types (i.e. primary backups and/or secondary backups).

In one or more embodiments of the invention, a location with respect to the timeline is identified for each tertiary backup marker. An identified location may be a point vertically aligned with a date marker corresponding to a partitioned time period in which a tertiary backup was generated. The identified location(s) may be at a predetermined level that is unique to tertiary backups.

In one or more embodiments of the invention, a graphical marker of the identified graphical marker type is instantiated at each of the identified locations.

In Step 542, a tertiary branch is generated connecting each generated tertiary backup marker to a secondary backup marker using the dependency graph.

In one or more embodiments of the invention, the tertiary branch(es) are generated by identifying a graphical marker type associated with a dependency between a tertiary backup and a secondary backup. The identified graphical marker type may be, for example, a line segment with visual characteristics that distinguish the line segment from other graphical marker types. A graphical marker of the identified graphical marker type may be instantiated between a respective secondary backup and a respective tertiary backup.

The method may proceed to FIG. 5D in accordance with one or more embodiments of the invention.

FIG. 5D shows a flowchart of a method in accordance with one or more embodiments of the invention. The method depicted in FIG. 5D may be used to generate frames showing a graphic user interface in accordance with one or more embodiments of the invention. The method shown in FIG. 5D may be used by, for example, a backup agent (120, FIG. 1). Other components of the system illustrated in FIG. 1 may perform the method of FIG. 5D without departing from the invention.

In Step 544, it is determined if a pointer interacts with a backup marker. If the pointer does interact with the backup marker, the method may proceed to Step 545. If the pointer does not interact with the backup marker, the method may end following Step 544.

In one or more embodiments of the invention, the backup marker is a graphical element in the graphic user interface. The backup marker may be, for example, a primary, secondary, or tertiary backup marker. As discussed above, an interaction may include the pointer being placed in the same location as the backup marker and/or selecting the backup marker.

In Step 545, an interactive overlay is generated displaying backup policies associated with the backup marker using the dependency graph.

In one or more embodiments of the invention, the frames displaying the graphic user interface may be modified according to the interaction between the pointer and the backup marker. The modifications may include adding the interactive overlay to the frame. An interactive overlay may be a graphical element that displays the backup policies of the backup represented by the backup marker. An example interactive overlay may be, for example, a window. The window may include field entries that allow a user to modify the backup policies.

The method may end following Step 545.

To further clarify aspects of embodiments of the invention, a non-limiting example is provided below.

Example 1

Figure 6A:
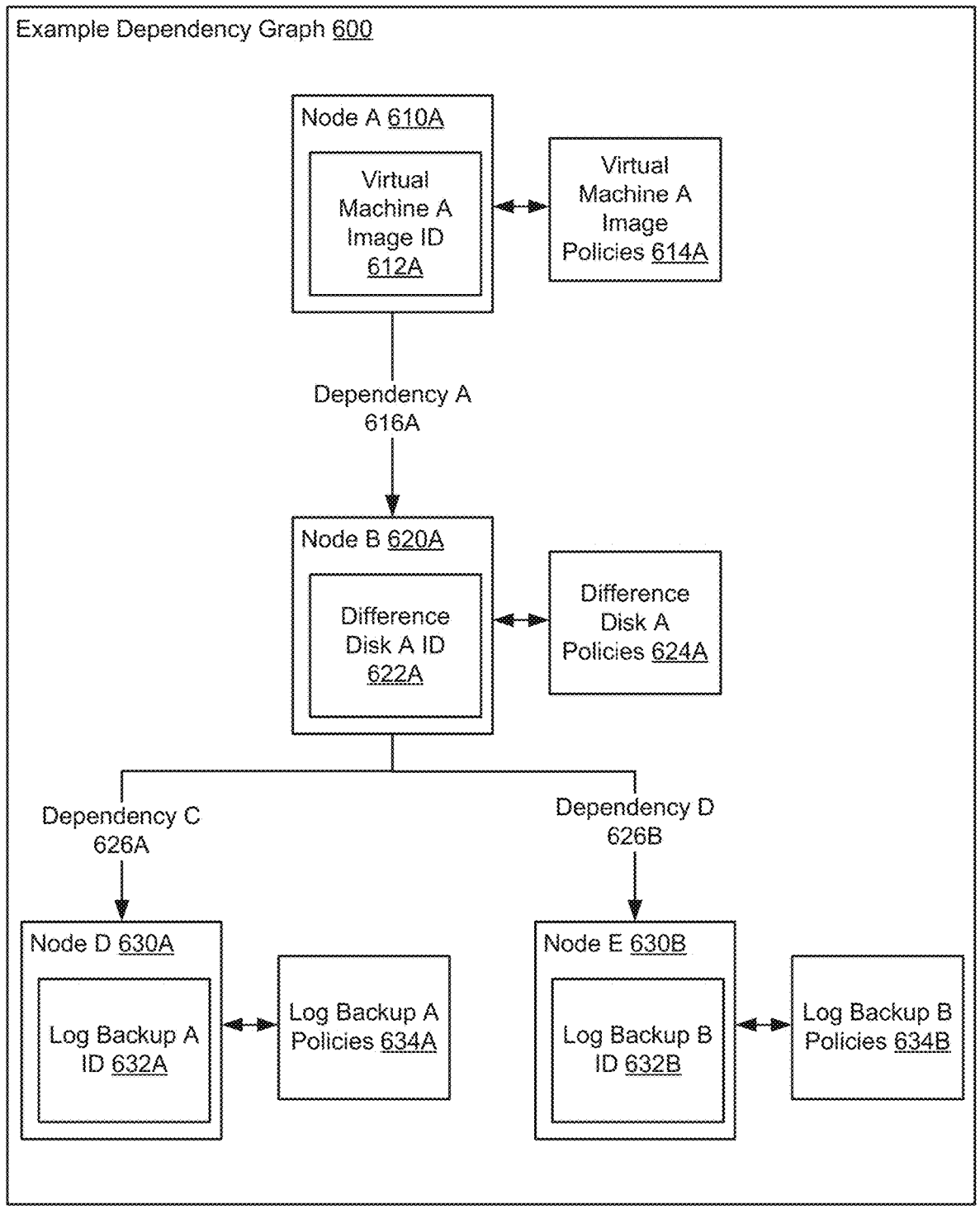
FIG. 6A shows a diagram of an example dependency graph.

Consider a scenario in which four backups of a virtual machine have been generated over a prior time period of four days (days 1-4), orchestrated by a backup agent, and a user has requested a backup analysis of the virtual machine. The backups may be a primary backup, a secondary backup that depends on the primary backup, and two tertiary backups that depend on the secondary backup. FIG. 6A shows a diagram of an example dependency graph (600) that illustrates the four backups and their dependencies. The example dependency graph (600) may include node A (610A) representing the primary node, identified by a virtual machine A image ID (612A), node B (620A) representing the secondary backup identified by difference disk A ID (622A), and nodes D and E (630A, 630B) each representing tertiary backups, identified by log backups A and B IDs (632A, 632B), respectively.

Figure 6B:
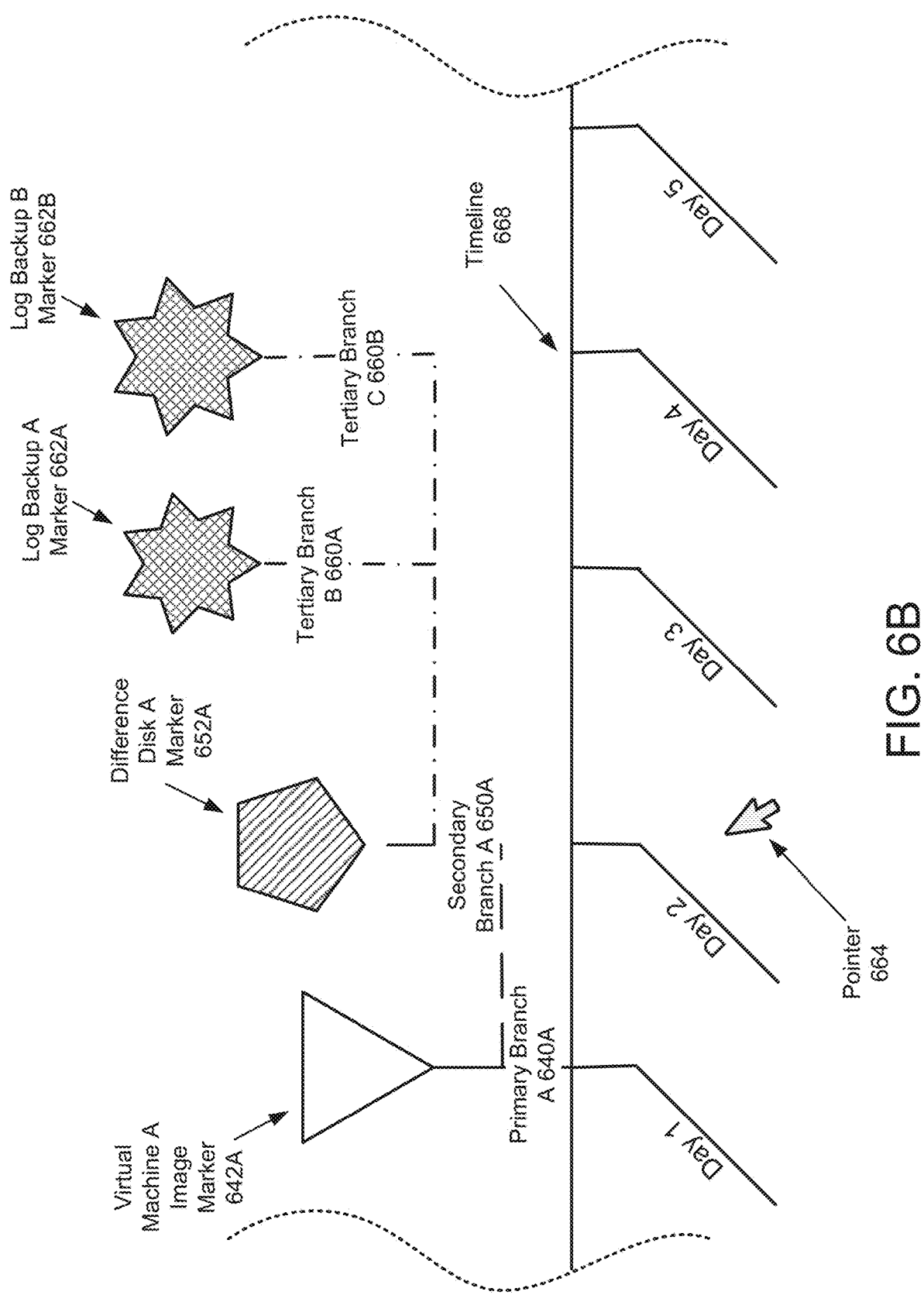
FIG. 6B shows a diagram of an example frame showing a graphic user interface.

The backup agent may use the example dependency graph (600) to generate frames showing a graphic user interface. FIG. 6B shows an example frame displaying a graphic user interface. The graphic user interface may include a timeline (668) displayed as a horizontal line with date markers corresponding to each date that the backups were generated. The graphic user interface may include backup markers (642A, 652A, 662A, 662B), each associated with a node in the example dependency graph (600, FIG. 7A). Virtual machine A image marker (642A) may be a backup marker associated with virtual machine A image. The virtual machine A image marker (642A) may be placed along a day 1 marker because the backup was generated on day 1. A primary branch (640A) may be generated to connect virtual machine A image marker (642A) to the timeline (668). Difference disk A marker (652A), corresponding to difference disk A, may be placed along a day 2 marker because difference disk A was generated on day 2. A secondary branch (650A) may be generated to connect difference disk A marker (652) to the virtual machine A image marker (642A). Similar methods may be used to generate log backup markers A and B (662A, 662B) and the tertiary branches (660A, 660B).

Figure 6C:
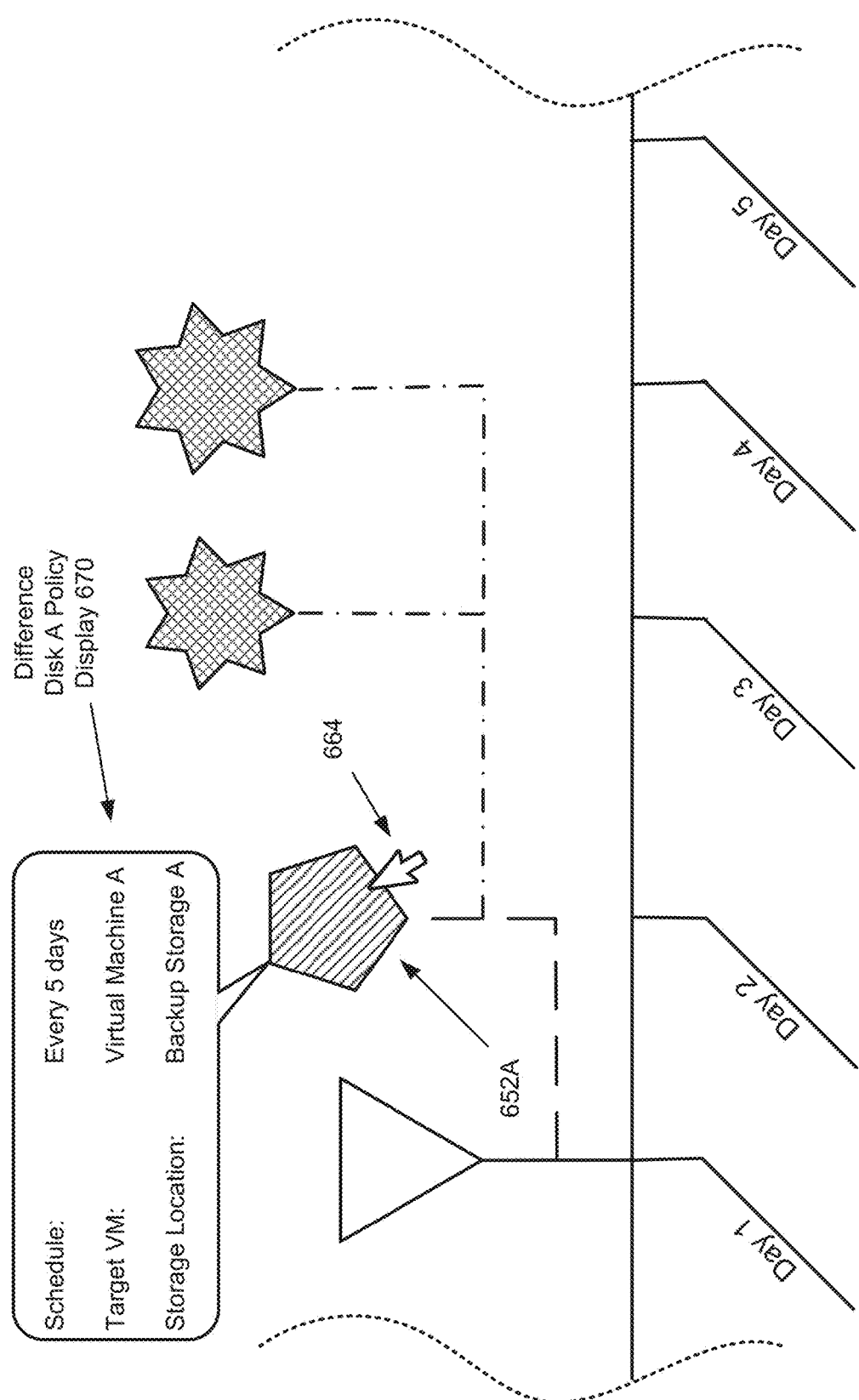
FIG. 6C shows a diagram of an example frame showing a graphic user interface.

The graphic user interface may include a pointer (664). The pointer (664) in FIG. 6B is not placed over any graphical element in the graphic user interface. FIG. 6C shows a frame displaying the graphic user interface with the pointer (664) placed over the difference disk A marker (652A). The placement of the pointer (664) may trigger the graphic user interface to display a difference disk A policy display (670). The policy display (670) may display the policies implemented by difference disk A. The policies may include a schedule of every 5 days, virtual machine A as the target virtual machine, and a location of the backup stored in backup storage A.

Figure 6D:
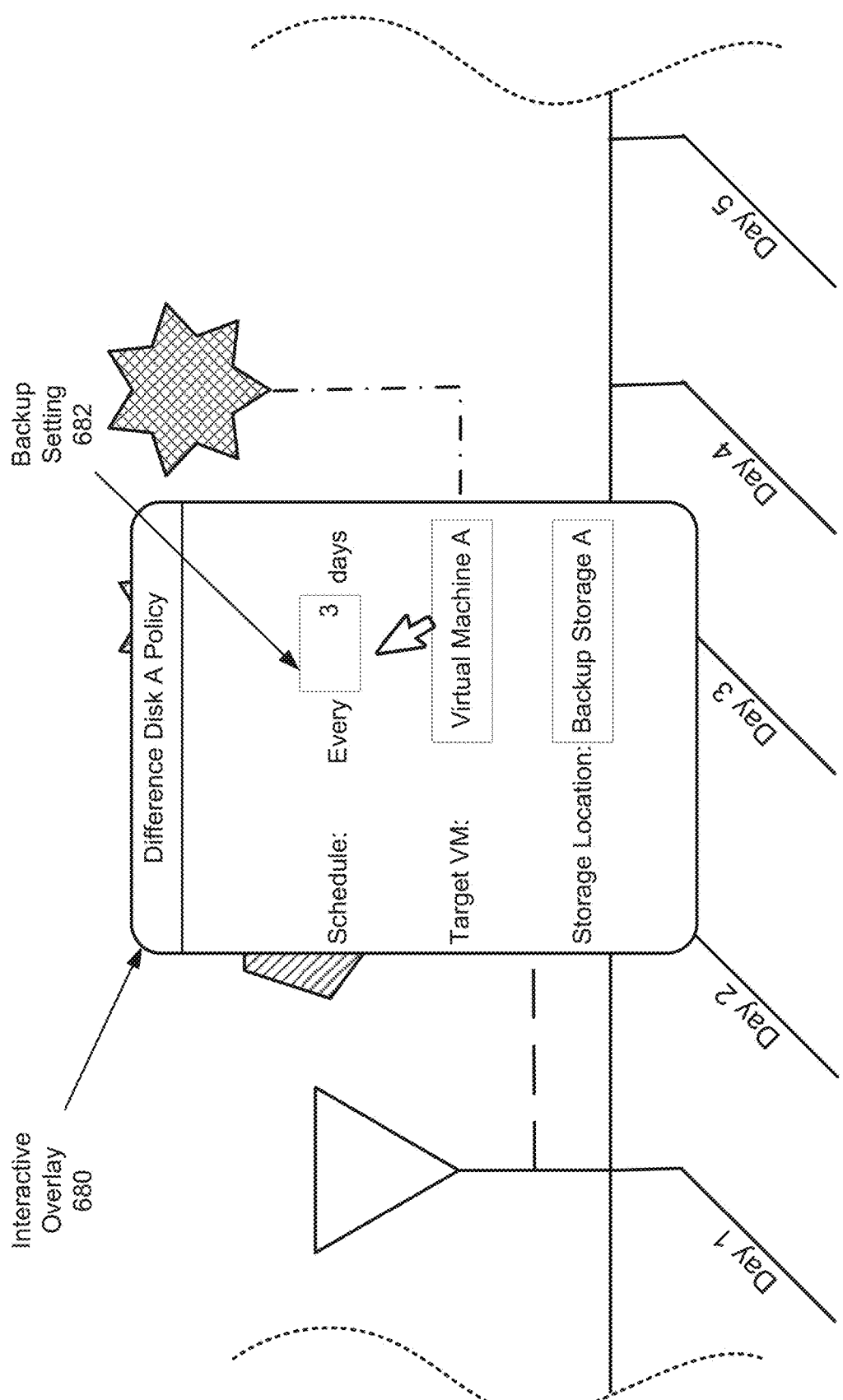
FIG. 6D shows a diagram of an example frame showing a graphic user interface.

The pointer (664) may select the difference disk A marker (652A) and trigger the graphic user interface to generate a window to modify the policy settings. FIG. 6D shows a frame displaying the graphic user interface with an interactive overlay (680) displayed. The interactive overlay may include the backup policies of difference disk A with the ability to modify the policies. A user may modify a backup setting (682) to view a prediction of effects of the change on the backup policies. The user may modify the schedule of 5 days to 3 days. In other words, the user may request to view the effect of the difference disk having implemented a schedule of every 3 days instead of every 5 days. The change in the backup setting (682) may prompt the graphic user interface to modify the frames.

Figure 6E:
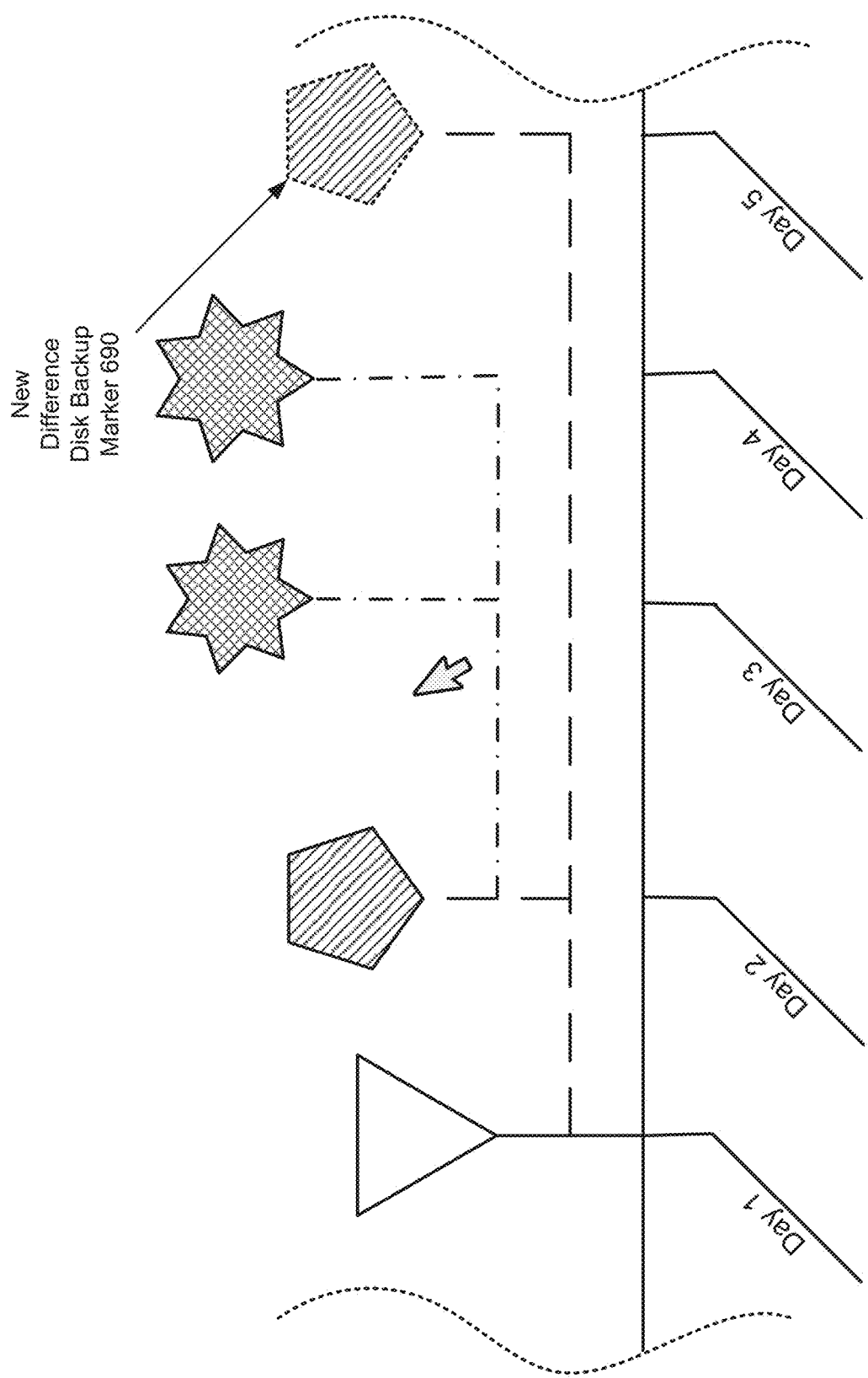
FIG. 6E shows a diagram of an example frame showing a graphic user interface.

FIG. 6E shows a frame with a new difference disk backup marker (690). The new difference disk backup marker (690) may be a prediction of a backup that would have been generated had difference disk A implemented a backup schedule of every 3 days. A difference disk may have been generated on day 5. Therefore, the new difference disk backup marker (690) may be placed along day 5.

The user may accept the update in backup policy settings for the backup, and future generated backups may implement the update.

End of Example 1

Figure 7:
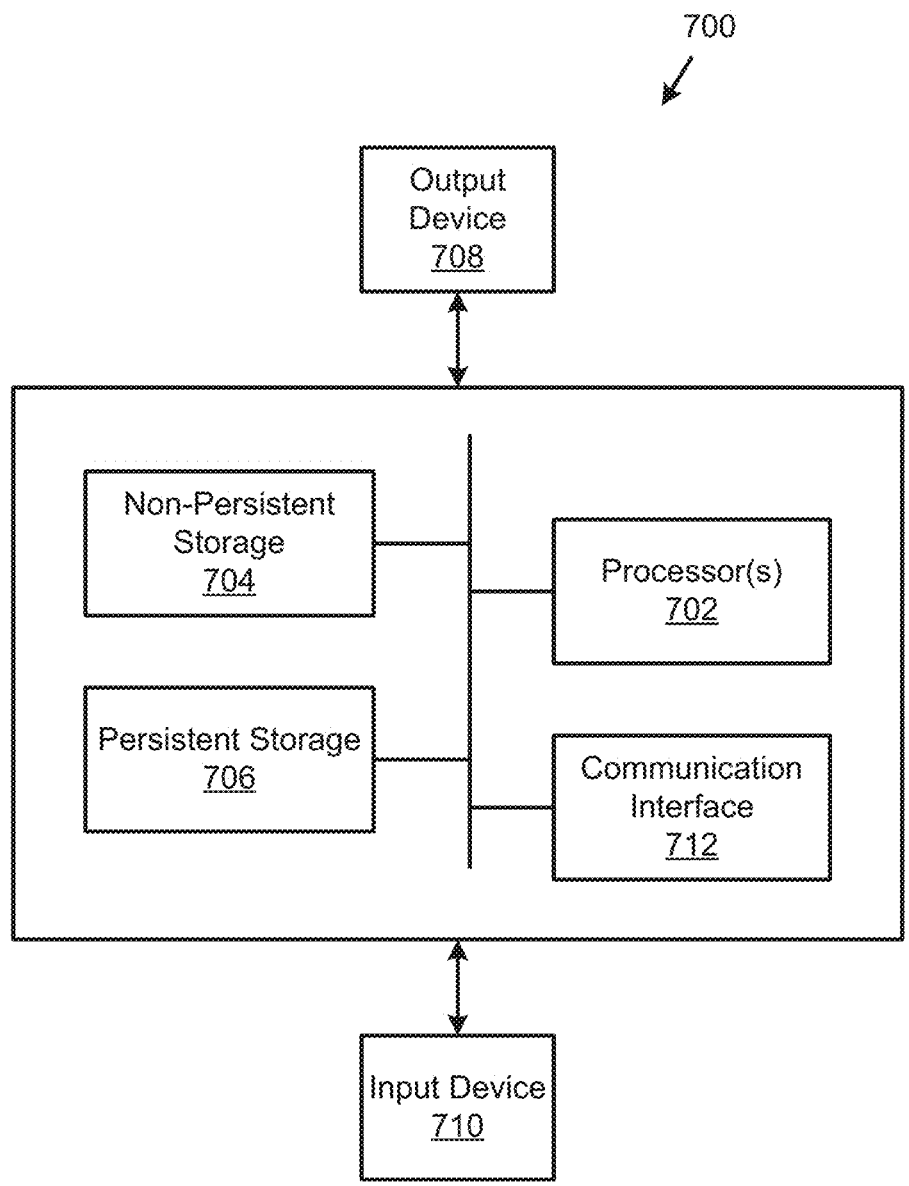
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may improve the operation of one or more computing devices. More specifically, embodiments of the invention may improve the reliability of storing data on a computing device. The reliability may be improved by allowing a user to visualize previously-stored data and policies implemented to generate the previously stored data. The visualization of the previously-stored data may enable the user to make changes to the policies. The changes to the policies may reduce the misuse of available computing resources, i.e. processor cycles, disk I/O, bandwidth, etc., used for generating backups.

Embodiments of the invention may decrease the cognitive burden on a user. More specifically, embodiments of the invention may condense information about stored data when the user performs a backup analysis of a virtual machine. For example, implemented backup policies may cause backups of a virtual machine to be generated at a higher rate than necessary. This may result in misuse of available computing resources, i.e., processor cycles, memory cycles, disk I/O, bandwidth, etc. A user may desire to reduce the rate of backups generated while having sufficient restoration points in the event of a failure of the virtual machine. Embodiments of the invention may improve an ability of the user to visualize the effect of changing the implemented backup policies. In contrast, contemporary implementations do not enable a user to efficiently understanding the impact of backup policies on the availability of data for restoration purposes.

Thus, embodiments of the invention may address the problem of inefficient use of computing resources by computing devices in a network environment. This problem arises due to the technological nature of the environment in which backup policies are implemented.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup agent for orchestrating backups of production hosts, comprising:
   a persistent storage storing backup policies; and
   a backup manager programmed to:
      obtain a backup analysis request for a virtual machine hosted by the production hosts;
      generate a dependency graph based on:
         backups associated with the virtual machines, and
         the backup policies associated with the backups;
      display a graphical user interface, using the dependency graph, comprising:
         a plurality of user interactive markers based on the backups; and
         dependency indicators interconnecting the plurality of user interactive markers;
      while the graphical user interface is displayed:
         obtain a potential backup policy update based on a user interaction with one of the user interactive markers;
      after obtaining the potential backup policy update:
         update the graphical user interface to reflect a hypothetical backup that would have been generated had a backup policy of the backup policies matched the potential backup policy update when a backup of the backups associated with the one of the user interactive markers was generated; and
      after updating the graphical user interface:
         initiate generation of the backup of the virtual machine using an updated backup policy of the backup policies that is based on the potential backup policy update.

2. The backup agent of claim 1, wherein displaying the graphical user interface comprises:
   generating a display space scaled timeline; and
   populating the display space scaled timeline with the plurality of user interactive markers based on respective periods of time associated with corresponding backups,
   wherein each user interactive marker of the user interactive markers is positioned a distance away from the display space scaled timeline based on a respective depth in the dependency graph of an associated backup.

3. The backup agent of claim 2, wherein displaying the graphical user interface further comprises:
   selecting two user interactive markers of the user interactive markers each associated with respective backups of the backups having different respective depths in the dependency graph;
   identifying a dependency indicator path between the two user interactive makers; and
   populating the dependency indicator path with a dependency indicator of the dependency indicators.

4. The backup agent of claim 3, wherein the dependency indicator comprises:
   a line segment having an appearance based on a respective depth in the dependency graph of one of the two user interactive markers of the user interactive markers.

5. The backup agent of claim 3, wherein each of the user interactive markers comprise:

a shape associated with a respective depth in the dependency graph of the respective user interactive marker; and a shading of the shape associated with the respective depth in the dependency graph of the respective user interactive marker.

6. The backup agent of claim 1, wherein generating the dependency graph comprises:
identifying a first backup of the backups that is a complete backup associated with a first period of time; and
generating a first node in the dependency graph comprising an identifier of the first backup.

7. The backup agent of claim 6, wherein generating the dependency graph further comprises:
identifying a second backup of the backups that is:
a partial backup associated with a second period of time that directly follows the first period of time, and
dependent on the first backup;
generating a second node in the dependency graph comprising an identifier of the second backup; and
generating a first association between the first node and the second node.

8. The backup agent of claim 7, wherein generating the dependency graph further comprises:
identifying a third backup of the backups that is:
a second partial backup associated with a third period of time that indirectly follows the first period of time, and
dependent on the first backup;
generating a third node in the dependency graph comprising an identifier of the third backup; and
generating a second association between the first node and the third node.

9. The backup agent of claim 7, wherein generating the dependency graph further comprises:
identifying a third backup of the backups that is:
a sub-partial backup associated with a third period of time that directly follows the second period of time, and
dependent on the second backup;
generating a third node in the dependency graph comprising an identifier of the third backup; and
generating a second association between the second node and the third node.

10. The backup agent of claim 7, wherein generating the dependency graph further comprises:
identifying a third backup of the backups that is:
a sub-partial backup associated with a third period of time that indirectly follows the second period of time, and
dependent on the second backup;
generating a third node in the dependency graph comprising an identifier of the third backup; and
generating a second association between the second node and the third node.

11. The backup agent of claim 1, wherein updating the graphical user interface to reflect the hypothetical backup that would have been generated had the backup policy of the backup policies reflected the potential backup policy update when the backup of the backups associated with the one of the user interactive markers was generated comprises:
identifying the backup of the backups associated with the one of the user interactive markers;
predicting a time shift based on the potential backup policy update; and
modifying a location of the one of the user interactive markers within the graphical user interface based on the time shift.

12. The backup agent of claim 11, wherein updating the graphical user interface to reflect the hypothetical backup that would have been generated had the backup policy of the backup policies reflected the potential backup policy update when the backup of the backups associated with the one of the user interactive markers was generated further comprises:
after modifying the location of the one of the user interactive markers within the graphical user interface based on the time shift:
modify a coloring of the one of the user interactive markers.

13. The backup agent of claim 12, wherein modifying the coloring of the one of the user interactive markers comprises:
modifying one selected from a group consisting of an outline thickness, an outline dashing style, a fill color, a fill shading, and a fill pattern.

14. The backup agent of claim 11, wherein updating the graphical user interface to reflect the hypothetical backup that would have been generated had the backup policy of the backup policies reflected the potential backup policy update when the backup of the backups associated with the one of the user interactive markers was generated further comprises:
predicting a second time shift based on the potential backup policy update; and
adding an additional user interactive marker at a location within the graphical user interface based on the second time shift.

15. A computing device for orchestrating backups of production hosts, comprising:
a persistent storage storing backup policies; and
a backup manager programmed to:
obtain a backup analysis request for a virtual machine hosted by the production hosts;
generate a dependency graph based on:
backups associated with the virtual machines, and
the backup policies associated with the backups;
transmit frames representative of a graphical user interface, using the dependency graph, comprising:
a plurality of user interactive markers based on the backups; and
dependency indicators interconnecting the plurality of user interactive markers;
after transmitting the frames:
receive a potential backup policy update based on a user interaction with one of the user interactive markers;
after obtaining the potential backup policy update:
transmit frames representative of an updated graphical user interface that reflects a hypothetical backup that would have been generated had a backup policy of the backup policies matched the potential backup policy update when a backup of the backups associated with the one of the user interactive markers was generated; and
after updating the graphical user interface:
initiate generation of the backup of the virtual machine using an updated backup policy of the backup policies that is based on the potential backup policy update.

16. The computing device of claim 15, wherein transmitting frames representative of a graphical user interface comprises:

generating a display space scaled timeline; and populating the display space scaled timeline with the plurality of user interactive markers based on respective periods of time associated with corresponding backups; and generating the frame based on the populated display space scaled timeline, wherein each user interactive marker of the user interactive markers is positioned a distance away from the display space scaled timeline based on a respective depth in the dependency graph of an associated backup.

17. The computing device of claim 16, wherein transmitting frames representative of a graphical user interface further comprises:

selecting two user interactive markers of the user interactive markers each associated with respective backups of the backups having different respective depths in the dependency graph;

identifying a dependency indicator path between the two user interactive makers; and populating the dependency indicator path with a dependency indicator of the dependency indicators.

18. A non-transitory computer readable medium comprising computer readable program code, which when executed by a computer processor enables the computer processor to perform a method for operating a backup agent for orchestrating backups of production hosts, the method comprising:

obtaining a backup analysis request for a virtual machine hosted by the production hosts;

generating a dependency graph based on:
backups associated with the virtual machines, and
backup policies associated with the backups;

displaying a graphical user interface using the dependency graph, comprising:
a plurality of user interactive markers based on the backups; and
dependency indicators interconnecting the plurality of user interactive markers;

while the graphical user interface is displayed:
obtaining a potential backup policy update based on a user interaction with one of the user interactive markers;

after obtaining the potential backup policy update:
updating the graphical user interface to reflect a hypothetical backup that would have been generated had a backup policy of the backup policies matched the potential backup policy update when a backup of the backups associated with the one of the user interactive markers was generated; and after updating the graphical user interface:
initiating generation of the backup of the virtual machine using an updated backup policy of the backup policies that is based on the potential backup policy update.

19. The non-transitory computer readable medium of claim 18, wherein displaying the graphical user interface comprises:

generating a display space scaled timeline; and populating the display space scaled timeline with the plurality of user interactive markers based on respective periods of time associated with corresponding backups, wherein each user interactive marker of the user interactive markers is positioned a distance away from the display space scaled timeline based on a respective depth in the dependency graph of an associated backup.

20. The non-transitory computer readable medium of claim 19, wherein displaying the graphical user interface further comprises:

selecting two user interactive markers of the user interactive markers each associated with respective backups of the backups having different respective depths in the dependency graph;

identifying a dependency indicator path between the two user interactive makers; and populating the dependency indicator path with a dependency indicator of the dependency indicators.

* * * * *

UNITED STATES PATENT AND TRADEMARK OFFICE
CERTIFICATE OF CORRECTION

PATENT NO. : 10,599,361 B2
APPLICATION NO. : 16/022604
DATED : March 24, 2020
INVENTOR(S) : Asif Khan et al.

Page 1 of 1

It is certified that error appears in the above-identified patent and that said Letters Patent is hereby corrected as shown below:

In the Claims

Column 22, Line 58, in Claim 3, the phrase "user interactive makers" should read -- user interactive markers --.

Column 25, Line 24, in Claim 17, the phrase "user interactive makers" should read -- user interactive markers --.

Column 26, Line 37, in Claim 20, the phrase "user interactive makers" should read -- user interactive markers --.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*